United States Patent
Ohno

(10) Patent No.: US 12,122,315 B2
(45) Date of Patent: Oct. 22, 2024

(54) TABLE DEVICE FOR VEHICLE

(71) Applicant: TOYOTA JIDOSHA KABUSHIKI KAISHA, Aichi-ken (JP)

(72) Inventor: Mitsuyoshi Ohno, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/165,930

(22) Filed: Feb. 8, 2023

(65) Prior Publication Data
US 2023/0331182 A1 Oct. 19, 2023

(30) Foreign Application Priority Data
Apr. 19, 2022 (JP) ................. 2022-068668

(51) Int. Cl.
*B60R 21/055* (2006.01)
*B60N 3/00* (2006.01)

(52) U.S. Cl.
CPC ............ *B60R 21/055* (2013.01); *B60N 3/001* (2013.01)

(58) Field of Classification Search
CPC ....... B60N 3/001; B60R 21/06; B60R 21/055; B60R 21/08; B60R 21/00
See application file for complete search history.

(56) References Cited

U.S. PATENT DOCUMENTS

| | | | | |
|---|---|---|---|---|
| 5,769,369 A | * | 6/1998 | Meinel ................... | B60N 3/001 248/176.1 |
| 2020/0114939 A1 | * | 4/2020 | Le Corre ............... | B60N 3/001 |
| 2023/0373371 A1 | * | 11/2023 | Coache ................. | B60N 3/001 |

FOREIGN PATENT DOCUMENTS

| | | | | |
|---|---|---|---|---|
| DE | 102007040159 A1 | * | 2/2009 | ............ B60N 3/001 |
| DE | 102012009556 A1 | * | 11/2013 | ............ B60N 2/005 |
| DE | 102019210001 A1 | * | 1/2021 | ............ B60N 2/005 |
| DE | 102020209765 A1 | * | 2/2022 | |
| JP | 202162639 A | | 4/2021 | |

OTHER PUBLICATIONS

Fuerst, Motor Vehicle With A Storage Device, Jan. 14, 2021, EPO, DE 102019210001 A1, Machine Translation of Description (Year: 2021).*

* cited by examiner

*Primary Examiner* — Paul N Dickson
*Assistant Examiner* — Matthew D Lee
(74) *Attorney, Agent, or Firm* — HAUPTMAN HAM, LLP

(57) ABSTRACT

The present disclosure relates to a vehicle table device provided between a front row seat and a rear row seat arranged to be aligned in a vehicle front-rear direction in a vehicle cabin. A table main body capable of placing an object on an upper surface thereof, and a pop-out suppression unit for preventing the object from popping out from the table main body, which has a shield portion protruding upward like a screen from a front end portion of the table main body when an acceleration such that the object pops out from the table main body to the front side in the vehicle front-rear direction occurs at the time of sudden braking or front projection.

13 Claims, 11 Drawing Sheets

TABLE DEVICE FOR VEHICLE

CROSS-REFERENCE TO RELATED APPLICATION

This application claims priority to Japanese Patent Application No. 2022-068668 filed on Apr. 19, 2022, incorporated herein by reference in its entirety.

BACKGROUND

1. Technical Field

The present disclosure relates to a table device for a vehicle. The table device is provided between seats arranged to be aligned in a vehicle front-rear direction in a vehicle cabin.

2. Description of Related Art

There has been known a table device that is provided on a floor of a vehicle and is used to place small objects by occupants.

For example, Japanese Unexamined Patent Application Publication No. 2021-062639 (JP 2021-062639 A) discloses a table device for means of transportation, which includes a plate-shaped table and a plate-shaped lower stage plate attached at a position lower than the table. The use position of the lower stage plate is lower than the top plate portion of the seat cushion of the vehicle seat, and serves as a footrest of the seated occupant.

SUMMARY

In the above-described JP 2021-062639 A, although a function other than placing small objects is added to the table device for means of transportation, an issue specific to a table provided in a vehicle is not mentioned, including a case where, at the time of sudden braking or vehicle collision, etc., the object placed on the table may pop out from the table in the vehicle front-rear direction by an inertial force. In this respect, there is room for improvement in the table device described in JP 2021-062639 A.

The present disclosure has been made in view of the above points, and an object of the present disclosure is to provide a technique for suppressing an object placed on a table from popping out from the table by an inertial force and hitting an occupant in a table device for a vehicle.

In order to achieve the above object, in the table device for the vehicle according to the present disclosure, (1) a partition is used to partition between the occupant and the object that is about to pop out from the table at the time of a sudden braking, a vehicle collision, etc., and/or (2) the object is suppressed from popping out from the table.

Specifically, the present disclosure is applied to a table device for a vehicle, which is provided between seats arranged in a vehicle cabin so as to be aligned in the vehicle front-rear direction.

The table device for the vehicle includes: a table main body, an object being able to be placed on an upper surface of the table main body; and a pop-out suppression unit for suppressing the object from popping out from the table main body when an acceleration is generated in the object, causing the object to pop out from the table main body toward a front side or a rear side in the vehicle front-rear direction.

According to this configuration, since the pop-out suppression unit that suppresses the object from popping out from the table main body when an acceleration is generated in the object, causing the object to pop out from the table main body toward the front side or the rear side in the vehicle front-rear direction, is provided, it is possible to suppress the object placed on the upper surface of the table main body from popping out from the table main body and hitting the occupant due to, for example, an inertial force at the time of sudden braking, front collision, or rear collision.

Further, in the above-described table device for the vehicle, the seats may be configured such that occupants sit facing each other in the vehicle front-rear direction. The pop-out suppression unit may include a plate-shaped shield portion that is provided on a lower side of the table main body and that is movable toward the front side in the vehicle front-rear direction at an acceleration equivalent to an acceleration of the object, by an inertial force during a sudden braking or a front collision. The shield portion may be made of a member having no elasticity on an upper surface side and a member having elasticity on a lower surface side, and may be configured to bend toward the upper surface side when a tensile force is applied to the lower surface side and to return to a straight line shape when the tensile force is released. A front end portion of the table main body may be provided with a guide portion that guides the shield portion upward while applying a tensile force to the lower surface side of the shield portion that is moving forward in the vehicle front-rear direction.

According to this configuration, in the case where an acceleration is generated in the object, causing the object to pop out from the table main body toward the front side in the vehicle front-rear direction by the inertial force during a sudden braking or a front collision, the shield portion also moves toward the front side in the vehicle front-rear direction by the inertial force at an acceleration equivalent to the acceleration of the object. Thus, since the guide portion is provided at the front end portion of the table main body, a tensile force is applied by the guide portion to the lower surface side of the shield portion that is moving toward the front side in the vehicle front-rear direction, at the front end portion of the table main body.

Here, the shield portion moving toward the front side in the vehicle front-rear direction is configured to bend toward the upper surface side when a tensile force is applied to the lower surface side and to return to a straight line shape when the tensile force is released, so that when passing through the guide portion, the shield portion bends toward the upper surface side and advances upward, and after passing through the guide portion, the tensile force is released, making the shield portion return to a straight line shape and extend straight upward.

As described above, since the shield portion protrudes upward from the front end portion of the table main body like a partition, the object that is about to pop out from the table main body toward the front side in the vehicle front-rear direction hits the shield portion, making it possible to suppress the object from hitting the occupant seated facing the rear direction on the seat on the front side in the vehicle front-rear direction.

Further, in the above-described table device for the vehicle, the pop-out suppression unit may include a plate-shaped shield portion that is provided on a lower side of the table main body and that is movable toward the rear side in the vehicle front-rear direction at an acceleration equivalent to an acceleration of the object, by an inertial force during a rear collision. The shield portion may be made of a member having no elasticity on an upper surface side and a member having elasticity on a lower surface side, and may be configured to bend toward the upper surface side when a tensile force is applied to the lower surface side and to return to a straight line shape when the tensile force is released. A rear end portion of the table main body may be provided with a guide portion that guides the shield portion upward while applying a tensile force to the lower surface side of the shield portion that is moving rearward in the vehicle front-rear direction.

According to this configuration, in the case where an acceleration is generated in the object, causing the object to pop out from the table main body toward the rear side in the vehicle front-rear direction by the inertial force during a rear collision, the shield portion also moves toward the rear side in the vehicle front-rear direction by the inertial force at an acceleration equivalent to the acceleration of the object. Thus, since the guide portion is provided at the rear end portion of the table main body, a tensile force is applied by the guide portion to the lower surface side of the shield portion that is moving toward the rear side in the vehicle front-rear direction, at the rear end portion of the table main body. Accordingly, when the shield portion moving toward the rear side in the vehicle front-rear direction passes through the guide portion, the shield portion bends toward the upper surface side and advances upward, and after passing through the guide portion, the tensile force is released, making the shield portion return to a straight line shape and extend straight upward.

As described above, since the shield portion protrudes upward from the rear end portion of the table main body like a partition, the object that is about to pop out from the table main body toward the rear side in the vehicle front-rear direction hits the shield portion, making it possible to suppress the object from hitting the occupant seated facing the front direction on the seat on the rear side in the vehicle front-rear direction.

Even when the shield portion protrudes upward from the front end portion or the rear end portion of the table main body, if the shield portion that has advanced to the end is returned due to repulsion or the like, the partition no longer exists, and therefore, the object that has popped out from the table main body toward the front side or the rear side in the vehicle front-rear direction may hit the occupant if the timing is bad.

In view of this, in the above-described table device for the vehicle, the pop-out suppression unit may include a return restriction unit for restricting a return movement of the shield portion toward the rear side or the front side in the vehicle front-rear direction so as to maintain a state in which the shield portion protrudes upward from the table main body.

According to this configuration, even if the shield portion that has advanced to the end is about to return due to repulsion or the like, the return movement of the shield portion toward the rear side or the front side in the vehicle front-rear direction is restricted by the return restriction unit, so that the state where the shield portion protrudes upward from the table main body can be maintained.

Further, in the above-described table device for the vehicle, the return restriction unit may be configured to be able to cancel a restriction of the return movement of the shield portion by a predetermined operation.

According to this configuration, it is possible to cancel the restriction of the return movement of the shield portion by performing a predetermined operation to the return restriction unit after suppressing the force to return due to repulsion or the like and maintaining a state in which the shield portion protrudes upward from the table main body, so that it possible to return the table device for the vehicle to the original state (before sudden braking or the like).

Further, in the above-described table device for the vehicle, the pop-out suppression unit may include a sub-shield portion that is provided on the lower side of the table main body and that moves in an opposite direction of the shield portion by utilizing a force of the shield portion moving in the vehicle front-rear direction, to protrude upward from an end portion of the table main body on an opposite side of an end portion in which the shield portion protrudes.

According to this configuration, during a sudden braking, a front collision, or a rear collision, even when the object that is about to pop out from the table main body toward the front side or the rear side in the vehicle front-rear direction from the table main body once hits the shield portion protruding upward from the front end portion or the rear end portion of the table main body and then bounces back toward the rear side or the front side in the vehicle front-rear direction, the sub-shield portion protrudes upward from the rear end portion or the front end portion of the table main body, so that it is possible to suppress the object that has bounced back from hitting the occupant seated on the seat on the rear side or the front side in the vehicle front-rear direction.

Further, in the above-described table device for the vehicle, the pop-out suppression unit may include an urging unit for urging the shield portion in the same direction as a direction in which the shield portion moves by an inertial force, and a restraining unit for restraining movement of the shield portion. The restraining unit may include a mass member, and may be configured to release a restraint on the shield portion when the mass member is moved by an inertial force in the vehicle front-rear direction by a predetermined amount or more.

According to this configuration, in the case where an acceleration is generated in the object, causing the object to pop out from the table main body in the vehicle front-rear direction by the inertial force, the mass member also moves in the vehicle front-rear direction by the inertial force, so that the restraint on the shield portion can be released with a simple structure. Thus, by the urging force of the urging unit, the shield portion is moved at a high speed toward the front side or the rear side in the vehicle front-rear direction, so that the state where the shield portion protrudes upward like a partition from the front end portion or the rear end portion of the table main body can be established more quickly. Therefore, it is possible to more reliably suppress the object that is about to pop out from the table main body from hitting the occupant.

The above-described table device for the vehicle may further include a detection unit for detecting a front collision or a rear collision. The pop-out suppression unit may include a squib for applying a driving force to the shield portion in the same direction as a direction in which the shield portion moves by an inertial force. The squib may be configured to be ignited to generate driving gas when a front collision or a rear collision is detected by the detection unit.

According to this configuration, when the detection unit detects the front collision or the rear collision of the vehicle, the squib is ignited to generate the driving gas, and the shield portion is moved at a higher speed toward the front side or the rear side in the vehicle front-rear direction, so that the state where the shield portion protrudes upward like a partition from the front end portion or the rear end portion of the table main body can be established even more quickly.

Further, in the above-described table device for the vehicle, the pop-out suppression unit may include a mass body that is heavier in weight than the shield portion and that is movable in the vehicle front-rear direction by an inertial force, and a gear mechanism for transmitting an inertial force of the mass body to the shield portion. The gear mechanism may include a first pinion gear that meshes with rack teeth provided in the mass body, and a second pinion gear that rotates coaxially with the first pinion gear and that meshes with rack teeth provided in the shield portion, the second pinion gear having a larger number of teeth than the first pinion gear.

According to this configuration, when a relatively heavy mass body moves toward the front side or the rear side in the vehicle front-rear direction, the first pinion gear meshing with the rack teeth provided in the mass body rotates, and the second pinion gear coaxial with the first pinion gear also rotates. Thus, the shield portion in which the rack teeth meshing with the second pinion gear is provided also moves toward the front side or the rear side in the vehicle front-rear direction, and since the second pinion gear has a larger number of teeth than the first pinion gear, the shield portion is moved at a high speed toward the front side or the rear side in the vehicle front-rear direction, so that the state where the shield portion protrudes upward like a partition from the front end portion or the rear end portion of the table main body can be established more quickly.

Further, in the above-described table device for the vehicle, the pop-out suppression unit may be a string member configured to be connected to the table main body on one end and configured to be connectable to the object on the other end. The pop-out suppression unit may include a placement determination unit for determining whether the object is placed on an upper surface of the table main body, a connection determination unit for determining whether the other end of the string member is connected to the object, and a control unit for controlling travel of the vehicle. The control unit may be configured to issue a warning to occupants and/or limit a speed of the vehicle to a predetermined speed or less when the placement determination unit determines that the object is placed and the connection determination unit determines that the other end of the string member is not connected to the object.

According to this configuration, with the one end of the string member being connected to the table main body, by connecting the other end of the string member to the object, it is possible to suppress the object placed on the upper surface of the table main body from popping out of the table main body by the inertial force.

It is conceivable that the occupant forgets to connect the other end of the string member to the object, so that when the placement determination unit determines that the object is placed and the connection determination unit determines that the other end of the string member is not connected to the object, the control unit issues a warning to occupants (and/or limits a speed of the vehicle to a predetermined speed or less). Accordingly, by prompting the occupant to connect the other end of the string member to the object (and/or by avoiding generation of an acceleration in the object, which causes the object to pop out from the table main body), the object can be suppressed from popping out from the table main body.

The above-described table device for the vehicle may further include a communication unit for periodically receiving a dynamic map. The control unit may be configured not to limit the speed of the vehicle when the vehicle is determined to be traveling on a particular road based on the dynamic map, even when the placement determination unit determines that the object is placed and the connection determination unit determines that the other end of the string member is not connected to the object.

For example, the possibility of an accident or sudden braking is very small on a road dedicated to autonomous driving vehicles. According to this configuration, the control unit is configured not to limit the speed of the vehicle when the vehicle is determined to be traveling on a particular road (a road dedicated to autonomous driving vehicles, etc.) based on the dynamic map, even when the placement determination unit determines that the object is placed and the connection determination unit determines that the other end of the string member is not connected to the object, so that it is possible to suppress unnecessary speed limit from being imposed.

Further, in the above-described table device for the vehicle, a dedicated pattern may be drawn on the upper surface of the table main body, the dedicated pattern being a pattern that is not visible to a naked eye and is able to be imaged by an infrared camera. The placement determination unit may be configured to determine whether the object is placed on the upper surface of the table main body based on an image captured by the infrared camera.

According to this configuration, by drawing a dedicated pattern that is not visible to the naked eye on the upper surface of the table main body, it is possible to improve the accuracy of determining whether an object is placed on the upper surface of the table main body without impairing the design of the table main body.

The above-described table device for the vehicle may further include a weight sensor for measuring a weight of the object placed on the upper surface of the table main body. The control unit may be configured to set the predetermined speed in accordance with the weight of the object measured by the weight sensor.

For example, if the weight of the object placed on the upper surface of the table main body is relatively light, it is unlikely to cause a serious incident even when the object that has popped out from the table main body hits the occupant. According to this configuration, the control unit sets a predetermined speed in accordance with the weight of the object measured by the weight sensor, so that it is possible to suppress unnecessary speed limit from being imposed.

Further, in the above-described table device for the vehicle, the pop-out suppression unit may include a plate-shaped shield portion that is provided on a lower side of the table main body and that is movable in the vehicle front-rear direction at an acceleration equivalent to an acceleration of the object, by an inertial force, and a string member configured to be connected to the table main body on one end and configured to be connectable to the object on the other end. The pop-out suppression unit may include a placement determination unit for determining whether the object is placed on an upper surface of the table main body, a connection determination unit for determining whether the other end of the string member is connected to the object, and a control unit for controlling travel of the vehicle. The shield portion may be made of a member having no elasticity on an upper surface side and a member having elasticity on a lower surface side, and may be configured to bend toward the upper surface side when a tensile force is applied to the lower surface side and to return to a straight line shape when the tensile force is released. The table main body may be provided with a guide portion that guides the shield portion upward while applying a tensile force to the lower surface side of the shield portion. The control unit may be configured to issue a warning to occupants and/or limit a speed of the vehicle to a predetermined speed or less when the placement determination unit determines that the object is placed and the connection determination unit determines that the other end of the string member is not connected to the object.

According to this configuration, when the placement determination unit determines that the object is placed and the connection determination unit determines that the other end of the string member is not connected to the object, the control unit issues a warning to occupants, or limits a speed of the vehicle to a predetermined speed or less. Accordingly, by prompting the occupant to connect the other end of the string member to the object, or by avoiding generation of an acceleration in the object, which causes the object to pop out from the table main body, the object can be suppressed from popping out from the table main body.

In addition, since there is a shield portion protruding upward from the front end portion or the rear end portion of the table main body like a partition, even if there is an erroneous determination of the connection determination unit or the like, it is possible to reliably suppress the object that is about to pop out from the table main body from hitting the occupant.

As described above, according to a table device for a vehicle of the present disclosure, it is possible to suppress an object placed on a table from popping out from the table by an inertial force and hitting an occupant.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
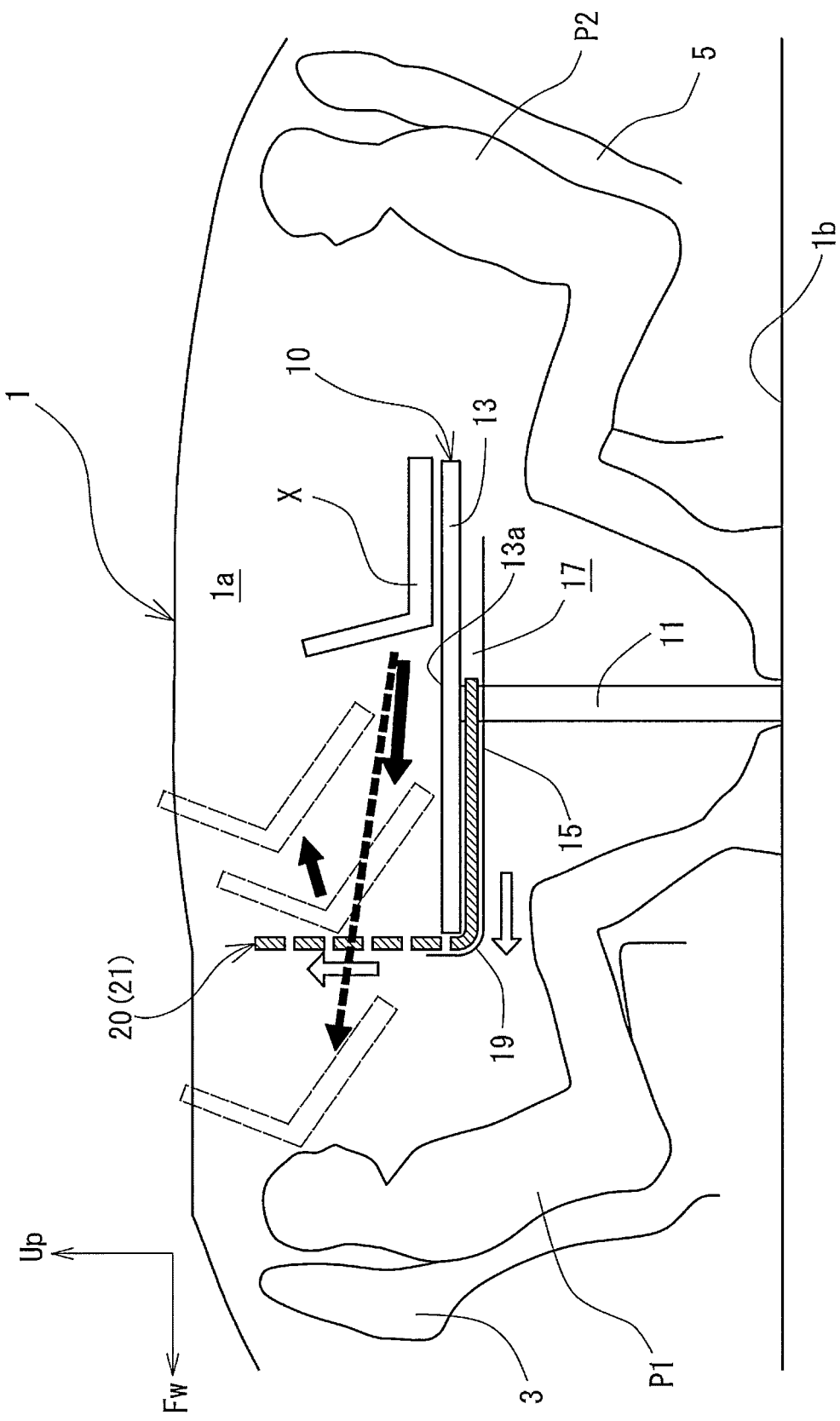
FIG. 1 is a diagram schematically showing a vehicle on which a vehicle table device according to a first embodiment of the present disclosure is mounted.

Hereinafter, an embodiment for carrying out the disclosure will be described with reference to the drawings. Note that the arrow Fw in the drawing indicates the front side in the vehicle front-rear direction, the arrow Lf in the drawing indicates the left side in the vehicle widthwise direction, and the arrow Up in the drawing indicates the up-down improvement side.

First Embodiment

FIG. 1 is a diagram schematically showing a vehicle 1 on which a vehicle table device 10 according to the present embodiment is mounted. The vehicle 1 is an autonomously-driven vehicle capable of autonomously traveling without requiring a driver. As shown in FIG. 1, seats 3 and 5 arranged in the vehicle front-rear direction are provided in the vehicle cabin 1a of the vehicle 1. As shown in FIG. 1, the front row seat 3 on the front side among the two rows of seats 3 and 5 is configured such that the occupant P1 can be seated in a backward direction. On the other hand, the rear row seat 5 on the rear side is configured such that the occupant P2 can be seated forward. That is, the front row seat 3 and the rear row seat 5 are provided so as to face each other in the vehicle front-rear direction, and the occupant P1, P2 is configured so as to be seated facing each other in the vehicle front-rear direction.

As shown in FIG. 1, the vehicle 1 is provided with a vehicle table device 10 between the front row seat 3 and the rear row seat 5. Vehicle table device 10 includes a pair of bases 11 arranged in the vehicle width direction provided on the floor 1b, a table main body 13 mounted on the upper end portion of the base 11 and capable of placing an object X (notebook personal computer in the present embodiment) on the upper surface 13a thereof, a cover 15 mounted on the lower side of the table main body 13 to form a space 17 between the table main body 13, and a pop-out suppression unit 20 housed in the space 17.

The pop-out suppression unit 20 is configured to suppress the object X from popping out from the table main body 13 by moving forward and upward in the vehicle front-rear direction by an inertial force, as indicated by a white arrow in FIG. 1, when an acceleration that pops out from the table main body 13 to the front side in the vehicle front-rear direction by an inertial force is generated in the object X at the time of sudden braking or in the front-rear projection. Hereinafter, the pop-out suppression unit 20 configured as described above will be described in detail.

POP-Out Suppression Unit

Figure 2:
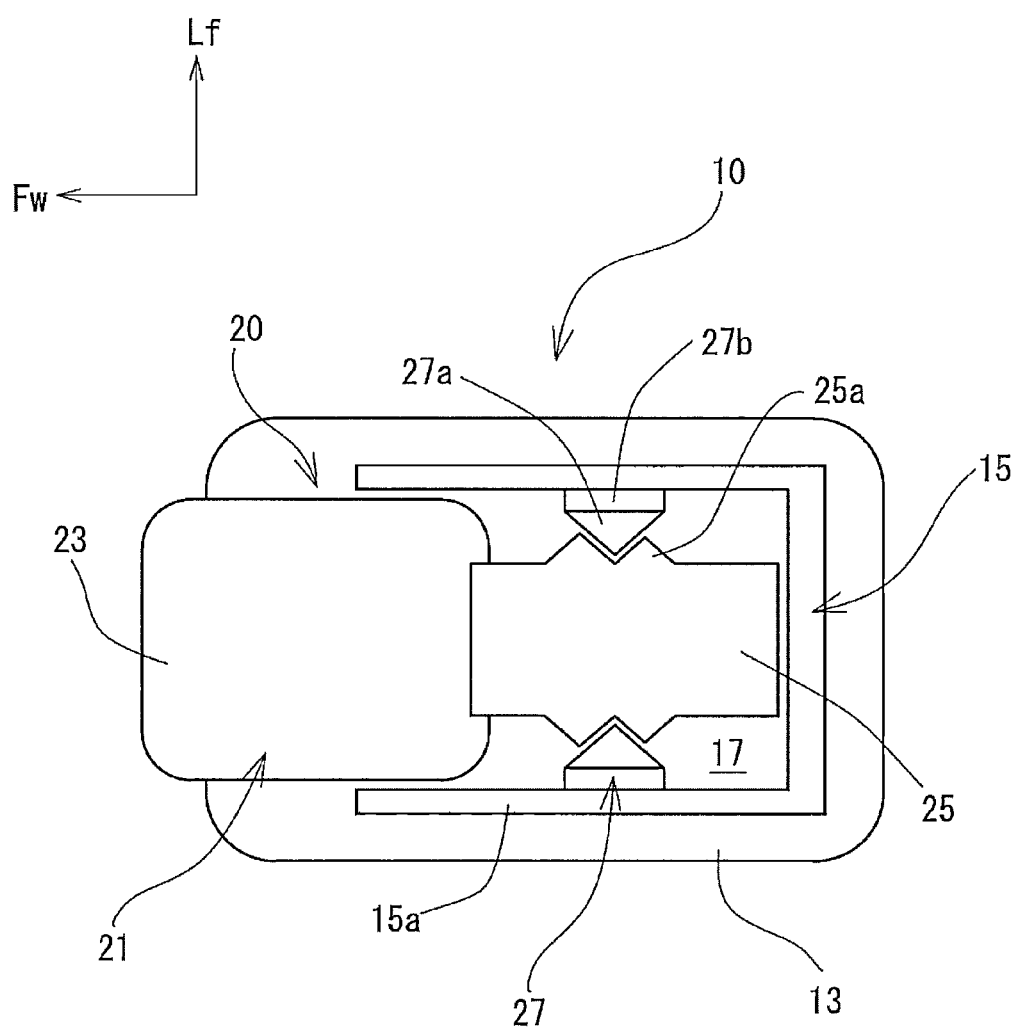
FIG. 2 is a view of the table main body viewed from below, schematically showing the pop-out suppression unit.

FIG. 2 is a view of the table main body 13 viewed from below schematically showing the pop-out suppression unit 20, and FIGS. 3A to 3E are views schematically showing the partition portion 23 of the shield portion 21. Note that, in FIG. 2, the bottom surface portion of the cover 15 is omitted for ease of illustration. The pop-out suppression unit 20 is provided in the space 17 (the lower side of the table main body 13), and has a plate-shaped shield portion 21 that is movable to the front side in the vehicle front-rear direction by the same acceleration as the object X by the inertial force at the time of sudden braking or at the time of front collision, and a stopper portion 27 for preventing the shield portion 21 from unintentionally projecting from the space 17.

As shown in FIG. 2, the shield portion 21 has a relatively light partition portion 23 and a relatively heavy weight portion 25, and the partition portion 23 and the weight portion 25 are connected such that the partition portion 23 is on the front side in the vehicle front-rear direction and the weight portion 25 is on the rear side in the vehicle front-rear direction.

The partition portion 23 is formed of a member having no elasticity on the upper surface side and a member having elasticity on the lower surface side. Specifically, as shown in the FIG. 3A, the partition portion 23 includes a light-weight hollow member (for example, a resin-made rectangular cylindrical member 23a extending in the vehicle-width direction), a high-strength member (for example, an aluminum cloth 23b) that is attached to the upper surfaces of the plurality of rectangular cylindrical members 23a and does not have stretchability, and an elastic member (for example, a rubber cloth 23c) that is attached to the lower surfaces of the plurality of rectangular cylindrical members 23a and has stretchability. Incidentally, in the FIG. 3A and the FIG. 3B, in order to make the drawing easy to see, while drawing by separating the rectangular cylindrical member 23a and the aluminum cloth 23b, it is drawn by separating the rectangular cylindrical member 23a and the rubber cloth 23c.

Figure 3C:
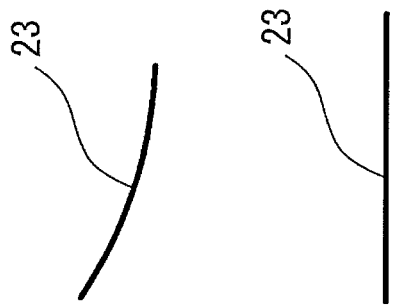
FIG. 3C is another diagram schematically showing a partition portion of the shielding portion.
Figure 3D:
FIG. 3D is another diagram schematically showing a partition portion of the shielding portion.
Figure 3E:
FIG. 3E is another diagram schematically showing a partition portion of the shielding portion.
Figure 3A:
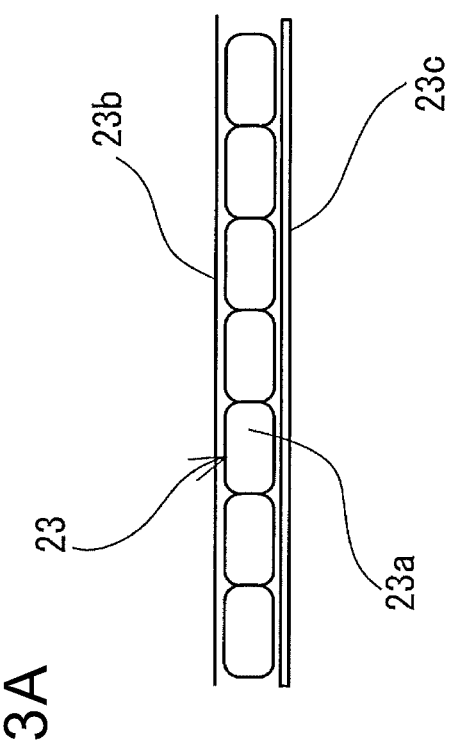
FIG. 3A is a diagram schematically showing a partition portion of the shielding portion.

As described above, in the partition portion 23, the upper surface side of the plurality of rectangular cylindrical members 23a is connected by the aluminum cloth 23b, and the lower surface side is connected by the rubber cloth 23c, so that it is continuously pulled by the rubber cloth 23c. As a result, in the unloaded condition in which no force is applied, as shown in the FIG. 3D, a straight and straight posture is adopted. Further, since the aluminum cloth 23b does not have stretchability, the partition portion 23 does not assume a bent attitude toward the lower surface as shown in FIG. 3E in any condition.

Figure 3B:
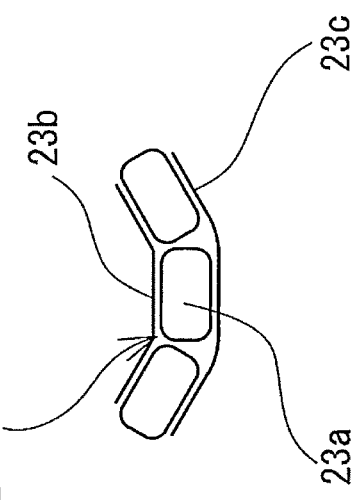
FIG. 3B is another diagram schematically showing a partition portion of the shielding portion.

On the other hand, when a tensile force is applied to the lower surface side of the partition portion 23, the rubber cloth 23c extends as shown in FIG. 3B, so that the partition portion is bent toward the upper surface side. That is, the partition portion 23, when a tensile force is applied to the lower surface side, as shown in the FIG. 3C, while bent to the upper surface side, when the tensile force is released, as shown in 3D, it is configured to return to a straight line.

Here, the inertial force acting on the object X and the partition portion 23 is different in proportion to the weight at the time of the sudden braking or the front collision, but since the acceleration generated in the object X and the partition portion 23 is theoretically the same, if the object X moves to the front side in the vehicle front-rear direction, the partition portion 23 should also move to the front side in the vehicle front-rear direction in the same manner. However, since the partition portion 23 is relatively light, there is a possibility that the movement toward the front side in the vehicle front-rear direction becomes unstable due to friction or the like between the table main body 13 and the cover 15.

Therefore, in the present embodiment, in order to stabilize the movement of the shield portion 21 including the partition portion 23 toward the front side in the vehicle front-rear direction, a relatively heavy weight portion 25 is provided. The weight portion 25 is formed in a plate shape by coating a metal plate with resin, for example. At both side edges of the weight portion 25 in the vehicle widthwise direction, two portions are respectively formed so that the engaged portions 25a having a triangular shape are arranged in the front-rear direction in a plan view.

As shown in FIG. 2, the stopper portion 27 has an engaging piece 27a having a triangular shape in plan view and a spring 27b. The engaging piece 27a is attached to the side wall portion 15a of the cover 15 via a spring 27b, and is fitted between two engaged portion 25a arranged in the front and rear in a normal state (other than in the case of sudden braking or in the case of front collision). As a result, it is possible to prevent the shield portion 21 from unintentionally protruding from the space 17 in a normal state.

On the other hand, since both the engaged portion 25a and the engaging piece 27a are formed in a triangular shape, when the shield portion 21 attempts to move to the front side in the vehicle front-rear direction by the inertial force during the sudden braking or the front collision, the spring 27b contracts (the engaging piece 27a is pushed downward toward the side wall portion 15a), so as to allow the shield portion 21 to move. Further, also when returning the shield portion 21 by human power or the like, when the shield portion 21 attempts to move to the vehicle-front-rear direction-rear side, the engaging piece 27a is pushed downward toward the side wall portion 15a, so that the engaging piece 27a is fitted between the two engaged portions 25a.

The front end portion of the table main body 13, while applying a pulling force to the lower surface side of the shield portion 21 moving in the vehicle front-rear direction front side, the guide portion 19 for guiding the shield portion 21 upward is provided. More specifically, as shown in FIG. 1, the guide portion 19 is formed by bending the cover 15 upward at a position corresponding to the front end portion of the table main body 13. As described above, by providing the guide portion 19 curved upward, the shield portion 21 moving toward the front side in the vehicle front-rear direction is subjected to a pulling force on the lower surface side of the shield portion 21 when passing through the guide portion 19. Incidentally, so that the shield portion 21 is smoothly guided upward along the guide portion 19, the shield portion 21 (partition portion 23) the lower end portion at the front end portion, it is preferable to perform R processing corresponding to the guide portion 19.

Action and Effect

According to the vehicle table device 10 of the present embodiment configured as described above, when an acceleration is generated in the object X so as to protrude from the table main body 13 toward the front side in the vehicle front-rear direction by the inertial force during the sudden braking or the front collision, the shield portion 21 also moves to the front side in the vehicle front-rear direction at the same acceleration as the object X by the inertial force. Thus, since the guide portion 19 is provided at the front end portion of the table main body 13, a pulling force is applied by the guide portion 19 to the lower surface side of the shield portion 21 (the partition portion 23) moving toward the front side in the vehicle front-rear direction at the front end portion of the table main body 13. Thus, the partition portion 23, when passing through the guide portion 19, as shown by the white arrow in FIG. 1, with advancing upward bent on the upper surface side, after passing through the guide portion 19, the pulling force returns to a straight line by escaping, a state extending straight upward.

As described above, since the partition portion 23 protrudes upward from the front end portion of the table main body 13, the object X does not hit the occupant P1 as indicated by the broken-line bold arrow in FIG. 1. That is, the object X that is about to protrude from the table main body 13 toward the front side in the vehicle front-rear direction comes into contact with the shielding portion 21 as indicated by the solid bold arrow in FIG. 1, and it is possible to suppress the object X from coming into contact with the occupant P1 seated in the front row seat 3 in the backward direction.

Modification 1

This modification is different from the first embodiment in that the return movement of the shield portion is restricted. Hereinafter, differences from the first embodiment will be mainly described.

As in the first embodiment, even if the shield portion 21 protrudes upward from the front end portion of the table main body 13, if the shield portion 21 that has stroked to the end returns due to repulsion or the like, the partition portion 23 is not present in front of the eyes of the occupant P1, and therefore, if the timing is poor, there is a possibility that the object X protruding from the table main body 13 toward the front-rear direction of the vehicle may hit the occupant P1.

Therefore, in the present modification, a return restricting means for restricting the return movement of the shield portion toward the rear side or the front side in the vehicle front-rear direction is provided so as to maintain a state in which the shield portion protrudes upward from the table main body 13.

Figure 4A:
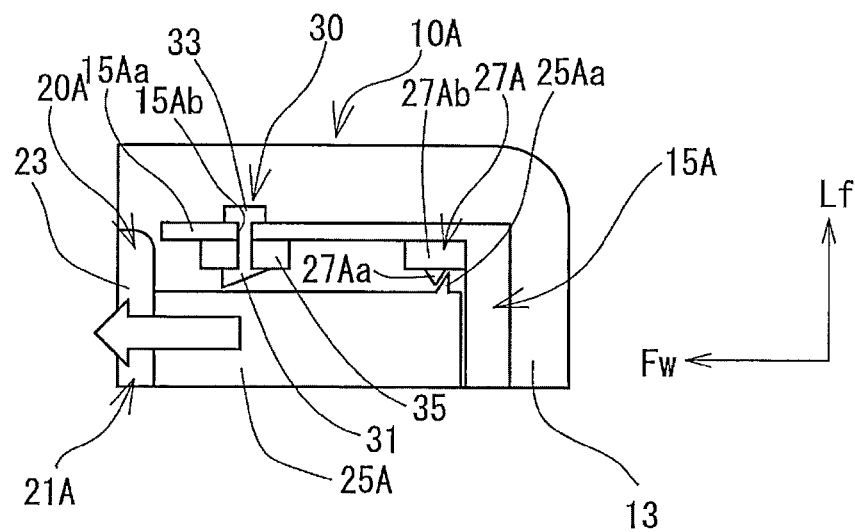
FIG. 4A shows a return regulating means according to a modification 1 of the first embodiment schematically, a view of the table main body from below.
Figure 4B:
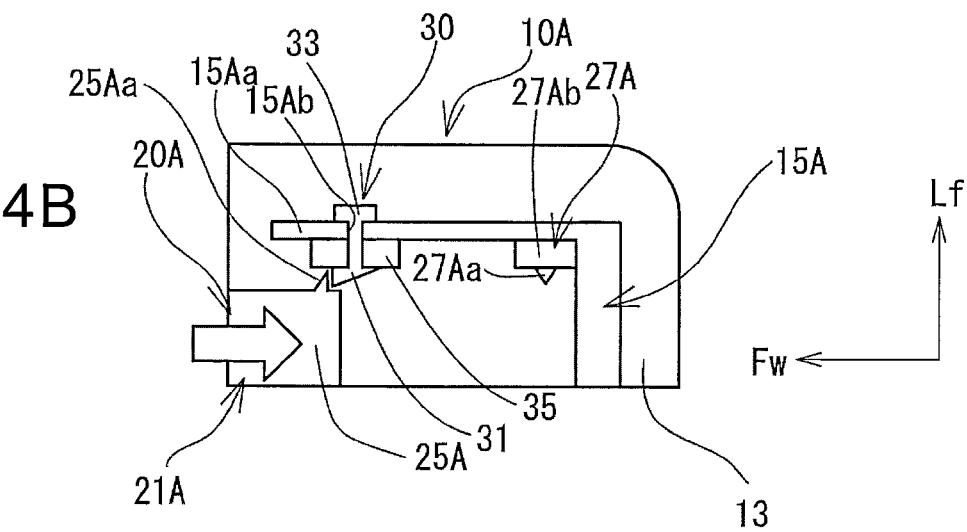
FIG. 4B shows a return regulating means according to a modification 1 of the first embodiment schematically, another view of the table main body from below.
Figure 4C:
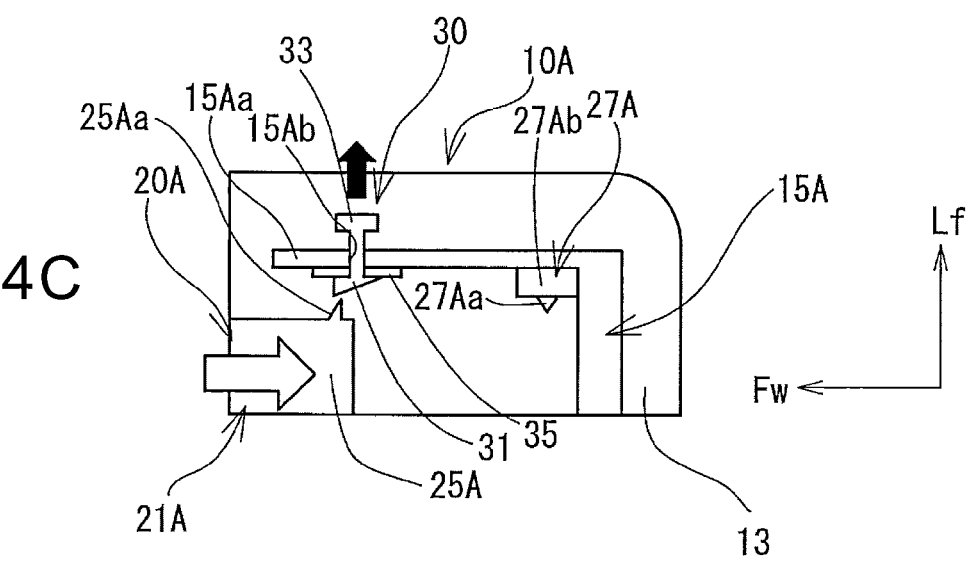
FIG. 4C shows a return regulating means according to a modification 1 of the first embodiment schematically, another view of the table main body from below.

FIGS. 4A to 4C are views of the table main body 13 viewed from below, schematically showing the return restricting unit 30 according to the present modification. In FIGS. 4A to 4C, the bottom surface portion of the cover 15A is omitted for the sake of clarity. The vehicle table device 10A according to the present modification has substantially the same configuration as that of the vehicle table device 10, and includes a base 11, a table main body 13, a cover 15A, and a pop-out suppression unit 20A. The cover 15A has substantially the same configuration as the cover 15 except that the mounting positions of the stopper portions 27A are different, the return restricting unit 30 is attached, and the through-hole 15Ab is formed on the side wall portion 15Aa.

The pop-out suppression unit 20A includes a shielding portion 21A, a stopper portion 27A, and a return restricting unit 30. The shielding portion 21A has substantially the same configuration as that of the shielding portion 21, and is formed by connecting the relatively light partition portion 23 on the front side in the vehicle front-rear direction and the relatively heavy weight portion 25A on the rear side in the vehicle front-rear direction.

Weight portion 25A, like the weight portion 25, for example, by coating the metal plate with resin, but is formed in a plate shape, unlike the weight portion 25, as shown in FIGS. 4A to 4C, the rear end portion of both side edges in the vehicle width direction, the engaged portion 25Aa of a right-angled triangular shape in plan view, the oblique side is formed so as to face the vehicle longitudinal direction front side.

As shown in FIGS. 4A to 4C, the stopper portion 27A includes an engaging piece 27Aa having a triangular shape in a plan view and a spring 27Ab. The engaging piece 27Aa is attached to the rear end portion of the side wall portion 15Aa of the cover 15A via a spring 27Ab, and is engaged with the oblique side of the engaged portion 25Aa in a normal state (other than the case of sudden braking or the case of front collision), as shown in FIG. 4A. Thus, during normal time, while the shield portion 21A is suppressed unintentionally projecting to the vehicle longitudinal direction front side, sudden braking or when returning the front projection or the shield portion 21A, by the spring 27Ab is contracted, the engaging piece 27Aa is pushed downward to the side wall portion 15Aa, so as to allow the movement of the shield portion 21A (see white arrows in FIG. 4A).

As illustrated in FIGS. 4A to 4C, the return restricting unit 30 includes an engaging piece 31 having a right-angled triangle shape in a plan view, an operating lever 33 that can be manually operated by the occupant P1, P2, and a spring 35. The engaging piece 31 is attached to the side wall portion 15Aa of the cover 15A via a spring 35 so that the oblique side faces the rear side in the front-rear direction. In the operating lever 33, a distal end of a shaft portion inserted into the through-hole 15Ab of the side wall portion 15Aa is connected to an adjacent piece (bottom side) of the engaging piece 31.

In the return restricting unit 30 configured as described above, when the shield portion 21A attempts to move to the front side in the front-rear direction by the inertial force during the sudden braking or the front collision, the oblique side of the engaged portion 25Aa and the oblique side of the engaging piece 31 come into contact with each other, so that the engaging piece 31 is pushed down toward the side wall portion 15Aa by contraction of the spring 35, thereby allowing the shield portion 21A to move.

On the other hand, as indicated by the white arrow in 4B, when the shield portion 21A that has been stroked to the end attempts to return due to repulsion or the like, since the opposite side (height) of the engaged portion 25Aa and the opposite side of the engaging piece 31 are engaged, the spring 35 is not contracted, so that the return of the shield portion 21A to the back-and-forth direction of the vehicle is restricted.

Further, after the sudden braking, as indicated by the black arrow in the FIG. 4C, when the occupant P1, P2 manually pulls the operating lever 33 outward in the vehicle-width direction (predetermined operation), the engaging piece 31 is pushed downward by the contraction of the spring 35 toward the side wall portion 15Aa, so that the restriction of the return movement of the shielding portion 21A can be released (see the white arrow in the FIG. 4C).

Effects

According to this modification, even if the shield portion 21A that has been stroked to the end is returning due to repulsion or the like, since the return movement of the shield portion 21A toward the rear side in the front-rear direction is restricted by the return restricting unit 30, the shield portion 21A (the partition portion 23) can be maintained protruding upward from the table main body 13.

Further, after maintaining the state in which the partition portion 23 protrudes upward from the table main body 13, by performing a predetermined operation to the return restricting unit 30, it is possible to release the restriction of the return motion of the shielding portion 21A, it is possible to return the vehicle table device 10A to the original (prior to sudden braking) state.

Modification 2

This modification is different from the first embodiment in that the moving speed of the shield portion is increased by using a mass body heavier in weight than the shield portion. Hereinafter, differences from the first embodiment will be mainly described.

Figure 5:
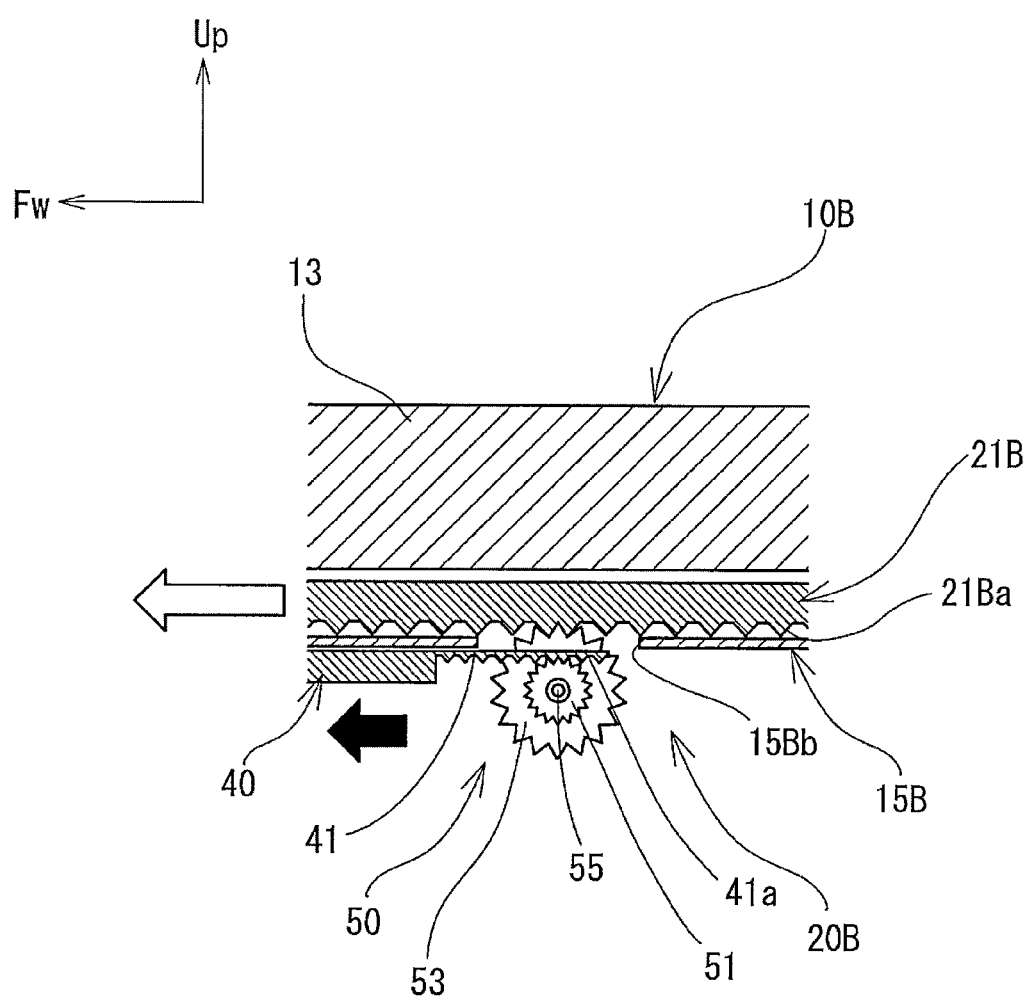
FIG. 5 is a diagram schematically showing a pop-out suppression unit according to Modification 2 of Embodiment 1.

FIG. 5 is a diagram schematically showing a pop-out suppression unit 20B according to the present modification. The vehicle table device 10B according to the present modification includes a base 11, a table main body 13, a cover 15B, and a pop-out suppression unit 20B. Cover 15B, except that the opening 15Bb for engaging the second pinion gear 53 with the shield portion 21B is formed on the bottom surface portion, a substantially similar configuration to the cover 15, attached to the lower side of the table main body 13, between the table main body 13, to accommodate the shield portion 21B It is adapted to form a space.

The pop-out suppression unit 20B includes a shield portion 21B, a mass body 40 having a weight heavier than that of the shield portion 21B, and a gear mechanism 50 that transmits the inertial force of the mass body 40 to the shield portion 21B.

Unlike the shield portion 21, the shield portion 21B does not have a portion corresponding to the relatively heavy weight portion 25, and has only a configuration similar to that of the relatively light partition portion 23. As shown in FIG. 5, the shielding portion 21B is accommodated in a space between the table main body 13 and the cover 15B, and a rack-tooth 21Ba is formed on a lower surface thereof.

The mass body 40 is formed in a plate shape, for example, by coating a metal plate with a resin. The mass body 40 is accommodated in a space between the cover 15B and a cover (not shown) provided on the lower side of the cover 15B, and is movable in the front-rear direction. As shown in FIG. 5, a power transmission portion 41 extending rearward is formed at a rear end portion of the mass body 40. The power transmission portion 41 is formed in a plate shape thinner than the mass body 40, and a rack-tooth 41a is formed on a lower surface thereof.

As illustrated in FIG. 5, the gear mechanism 50 includes a first pinion gear 51 having a small diameter, a second pinion gear 53 having a large diameter, and a shaft portion 55 common to the first and second pinion gears 51 and 53. The shaft portion 55 extends in the vehicle-width direction and is rotatably supported by, for example, brackets (not shown) provided in the cover 15B. The first pinion gear 51 meshes with a rack-tooth 41a formed in the power transmission portion 41 of the mass body 40 and rotates together with the shaft portion 55. The second pinion gear 53 meshes with the rack-teeth 21Ba formed on the shield portion 21B, and is coaxial with the first pinion gear 51, that is, rotates together with the shaft portion 55. The second pinion gear 53 is formed so as to have a larger number of teeth than the first pinion gear 51.

Action and Effect

In the vehicle table device 10B according to the present modification configured as described above, when an acceleration is generated in the object X so as to protrude from the table main body 13 toward the front side in the vehicle front-rear direction by the inertial force during the sudden braking or the front collision, the mass body 40 also moves to the front side in the vehicle front-rear direction at the same acceleration as the object X by the inertial force as indicated by the black arrow in FIG. 5. As described above, when the relatively heavy mass body 40 moves to the front-rear direction of the vehicle, the first pinion gear 51 meshing with the rack-teeth 41a formed in the power transmission portion 41 of the mass body 40 rotates counterclockwise in FIG. 5, and the second pinion gear 53 coaxial with the first pinion gear 51 also rotates counterclockwise in FIG. 5.

Thus, the shield portion 21B in which the rack-teeth 21Ba meshing with the second pinion gear 53 is formed, as indicated by the white arrow in FIG. 5, is moved to the front side in the vehicle front-rear direction, but since the second pinion gear 53 has a larger number of teeth than the first pinion gear 51, the shield portion 21B can be moved to the front side in the vehicle front-rear direction at a high speed. Therefore, it is possible to more quickly produce a situation in which the shielding portion 21B protrudes upward like a screen from the front end portion of the table main body 13, and it is possible to reliably suppress the object X from hitting the occupant P1.

Second Embodiment

The present embodiment differs from the first embodiment in that the object X is suppressed from protruding from the table main body 13 toward the rear side in the front-rear direction by the inertial force and hitting the occupant P2 during the rear projection. Hereinafter, differences from the first embodiment will be mainly described.

Figure 6:
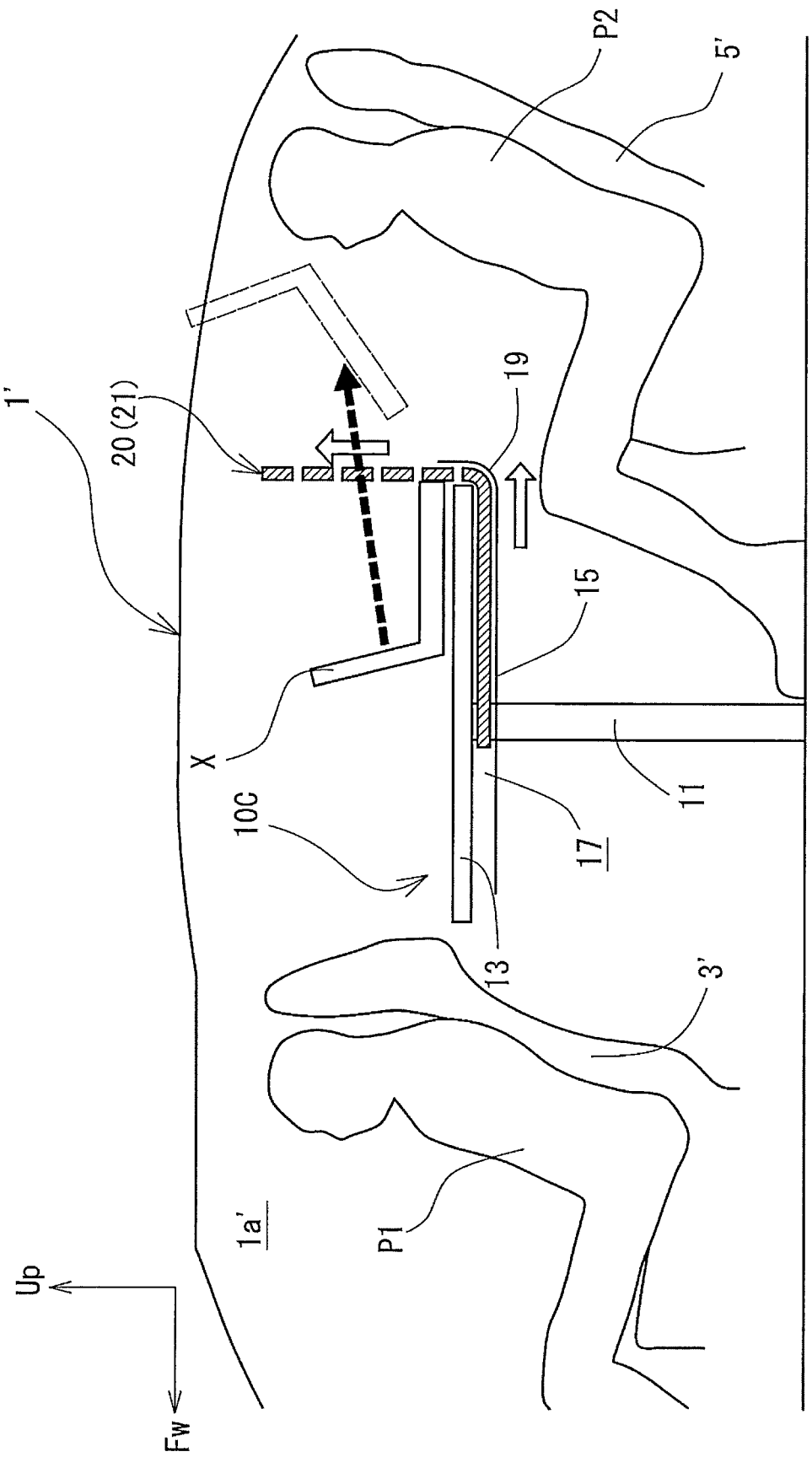
FIG. 6 is a diagram schematically illustrating a vehicle on which the vehicle table device according to the second embodiment is mounted.

FIG. 6 is a diagram schematically showing a vehicle 1' on which the vehicle table device 10C according to the present embodiment is mounted. As shown in FIG. 6, seats 3' and 5' arranged in the vehicle front-rear direction are provided in the vehicle cabin 1a' of the vehicle 1'. The front row seat 3' on the front side and the rear row seat 5' on the rear side are configured such that the occupant P1, P2 can be seated forward.

As shown in FIG. 6, the vehicle 1' is provided with a vehicle table device 10C between the front row seat 3' and the rear row seat 5'. The vehicle table device 10C only reverses the front and rear of the vehicle table device 10 according to the first embodiment, and therefore the structural explanation thereof will be omitted.

Action and Effect

According to the present embodiment, in a case where an acceleration that protrudes from the table main body 13 toward the rear side in the vehicle front-rear direction by the inertial force occurs in the object X at the time of the rear collision, the shield portion 21 also moves to the rear side in the vehicle front-rear direction at the same acceleration as the object X by the inertial force. Thus, since the guide portion 19 is provided at the rear end portion of the table main body 13, a pulling force is applied by the guide portion 19 to the lower surface side of the shield portion 21 (the partition portion 23) moving toward the rear side in the vehicle front-rear direction at the rear end portion of the table main body 13. Thus, the partition portion 23, as indicated by the white arrow in FIG. 6, when passing through the guide portion 19, along with advancing upward bent to the upper surface side, after passing through the guide portion 19, the pulling force returns to a straight line by passing through, a state of extending straight upward.

As described above, since the partition portion 23 protrudes upward from the rear end portion of the table main body 13, the object X does not hit the occupant P2 as indicated by the broken-line bold arrow in FIG. 6. That is, the object X that is about to protrude from the table main body 13 toward the rear side in the vehicle front-rear direction comes into contact with the shielding portion 21, and it is possible to suppress the object X from coming into contact with the occupant P2 seated in the rear row seat 5' in the forward direction.

Embodiment 3

The present embodiment differs from the first embodiment in that the object X that has bounced back after once hitting the shielding portion is suppressed from hitting the occupant P2. Hereinafter, differences from the first embodiment will be mainly described.

Figure 7:
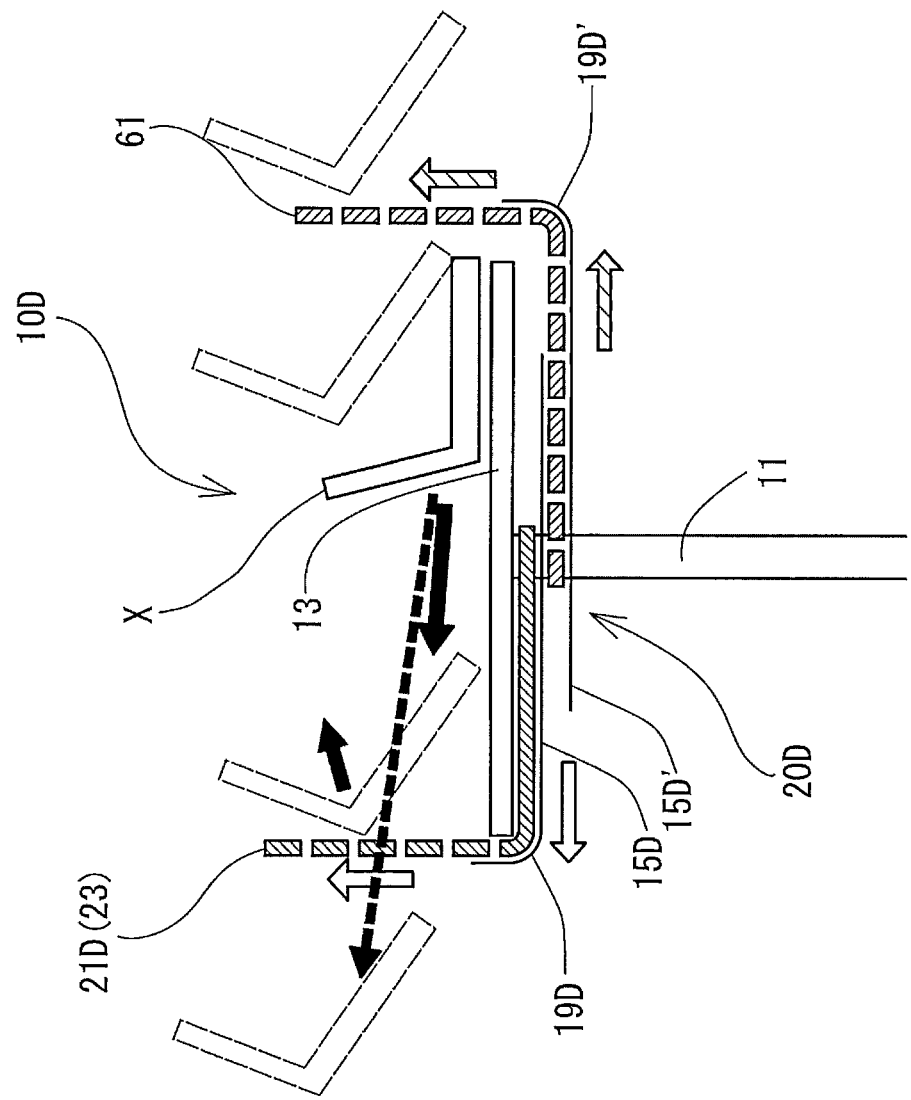
FIG. 7 is a diagram schematically illustrating a vehicle table device according to a third embodiment.
Figure 8:
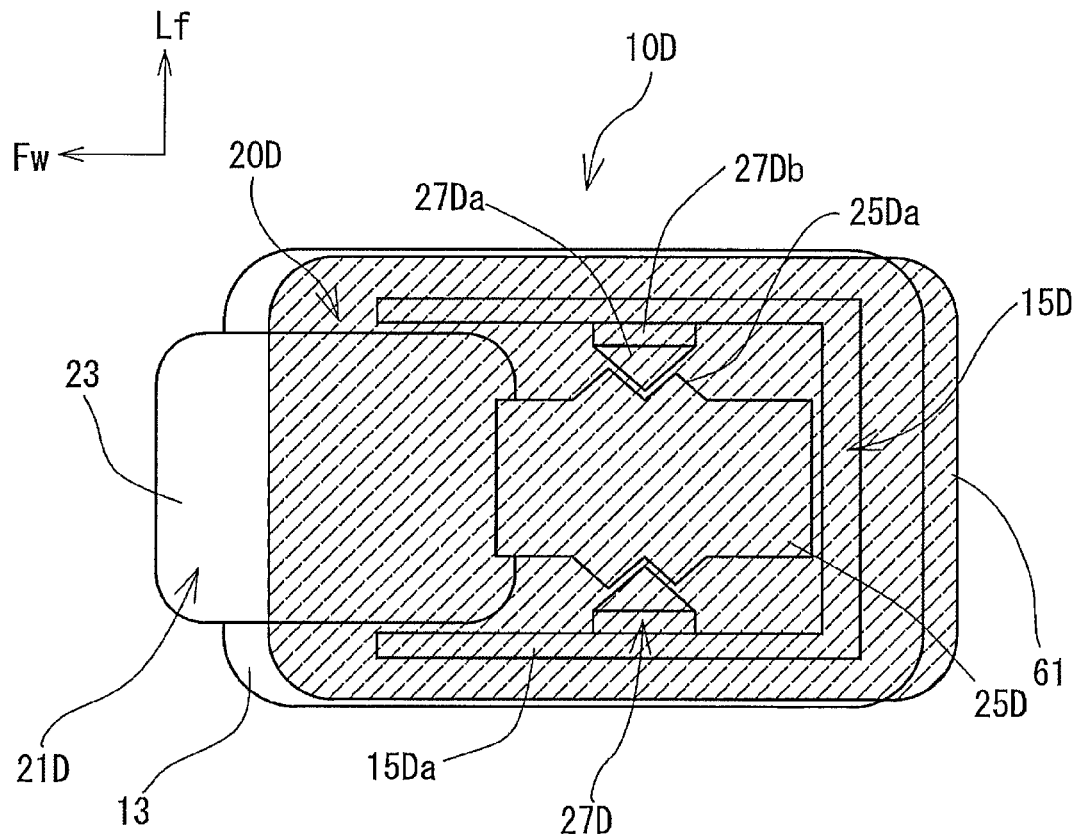
FIG. 8 is a view of the table main body viewed from below, schematically showing the pop-out suppression unit.
Figure 9:
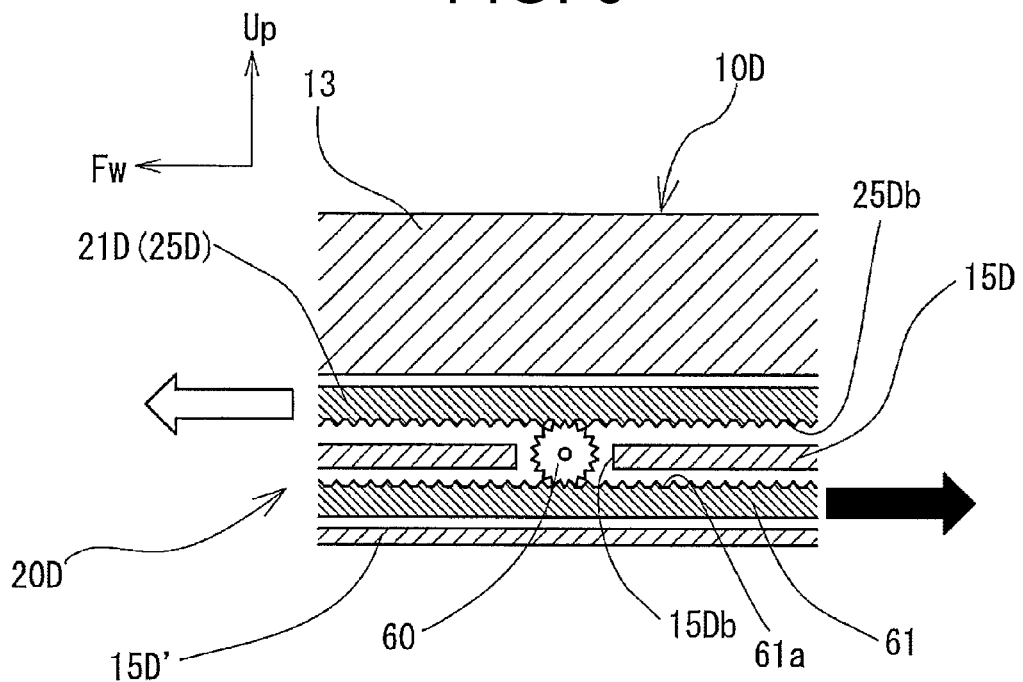
FIG. 9 is a view schematically showing a pop-out suppression unit.

FIG. 7 is a diagram schematically showing the vehicle table device 10D according to the present embodiment, FIG. 8 is a diagram schematically showing the pop-out suppression unit 20D, and FIG. 9 is a diagram schematically showing the pop-out suppression unit 20D when the table main body 13 is viewed from below. The vehicle table device 10D according to the present embodiment includes a base 11, a table main body 13, an upper cover 15D, a lower cover 15D', and a pop-out suppression unit 20D. Note that, in FIG. 8, the bottom surface portion and the lower cover 15D' of the upper cover 15D are not shown in the drawings for the sake of clarity.

Upper cover 15D, except that the opening 15Db for engaging the pinion gear 60 with the shield portion 21D is formed on the bottom surface portion, a substantially similar configuration to the cover 15, attached to the lower side of the table main body 13, between the table main body 13, to accommodate the shield portion 21D It is adapted to form a space. As shown in FIG. 7, the upper cover 15D has a guide portion 19D that is curved upward, similar to the guide portion 19.

On the other hand, the lower cover 15D' has substantially the same configuration as that of the cover 15 except that the stopper portion 27D is not attached and the front-rear direction is reversed, and is attached to the lower side of the upper cover 15D to form a space between the upper cover 15D and the sub-shield portion 61. Also, the lower cover 15D' is formed with a guide portion 19D' that is curved upward, similar to the guide portion 19.

As shown in FIGS. 8 and 9, the pop-out suppression unit 20D is housed between the table main body 13 and the upper cover 15D, and has a plate-shaped shield portion 21D which is movable to the front side in the vehicle front-rear direction by an inertial force at the time of sudden braking or at the time of front collision, a stopper portion 27D for suppressing the shield portion 21D from unintentionally projecting, a plate-shaped sub-shield portion 61 which is housed between the upper cover 15D and the lower cover 15D' and is movable to the rear side in the vehicle front-rear direction at the time of sudden braking or at the time of front collision, and a pinion gear 60 which transmits the inertial force of the shield portion 21D to the sub-shield portion 61.

The shielding portion 21D has the same configuration as that of the shielding portion 21, and the relatively light partition portion 23 and the relatively heavy weight portion 25D are connected such that the partition portion 23 is on the front side in the vehicle front-rear direction and the weight portion 25D is on the rear side in the vehicle front-rear direction. In the weight portion 25D, as in the weight portion 25, the engaged part 25Da is formed on both side edges thereof, while unlike the weight portion 25, a rack-tooth 25Db is formed on the lower surface thereof as shown in FIG. 9.

On the other hand, the sub-shield portion 61 has a configuration similar to that of the above-described partition portion 23, and includes a light-weight hollow member, a high-strength member that is affixed to the upper surfaces of the plurality of hollow members and does not have stretchability, and an elastic member that is affixed to the lower surfaces of the plurality of hollow members and has stretchability. That is, the sub-shield portion 61 is lighter in weight than the shield portion 21D having the weight portion 25D. With such a configuration, when the sub-shield portion 61 moves to the rear side in the vehicle front-rear direction, at the rear end portion of the table main body 13, a pulling force is applied to the lower surface side of the sub-shield portion 61 by the guide portion 19D', thereby, the sub-shield portion 61, as indicated by the hatching arrows in FIG. 7, when passing through the guide portion 19D', along with advancing upward by being bent toward the upper surface side, after passing through the guide portion 19D', the pulling force returns to a straight line by passing through, so as to protrude upward from the rear end portion of the table main body 13 It has become. As shown in FIG. 9, a rack-tooth 61a is formed on the upper surface of the sub-shield portion 61.

The stopper portion 27D has a configuration similar to that of the stopper portion 27, and includes an engaging piece 27Da that engages with the engaged portion 25Da of the weight portion 25D, and a spring 27Db that attaches the engaging piece 27Da to the side wall portion 15Da of the upper cover 15D.

The pinion gear 60 is rotatably supported by, for example, brackets (not shown) provided in the upper cover 15D. As shown in FIG. 9, the pinion gear 60 meshes with the rack teeth 25Db formed in the shield portion 21D (the weight portion 25D), and also meshes with the rack teeth 61a formed in the sub-shield portion 61. As a result, when the shield portion 21D moves in the front-rear direction, the pinion gear 60 rotates, and the sub-shield portion 61 moves away from the shield portion 21D.

Action and Effect

According to the present embodiment, since the engaging piece 27Da of the stopper portion 27D is engaged with the engaged portion 25Da of the weight portion 25D, it is possible to prevent the shielding portion 21D from unintentionally projecting to the front side in the front-rear direction of the vehicle during normal operation. Further, although those corresponding to the stopper portion 27D are not provided in the sub-shield portion 61 itself, the presence of the pinion gear 60 meshes with the rack teeth 25Db of the weight portion 25D, and also meshes with the rack teeth 61a of the sub-shield portion 61, since the movement of the shield portion 21D and the sub-shield portion 61 is coincident, normally, the sub-shield portion 61 is unintentionally it is possible to suppress the projection toward the rear side in the vehicle longitudinal direction.

When an acceleration is generated in the object X so as to protrude from the table main body 13 toward the front side in the vehicle front-rear direction by the inertial force during the sudden braking or the front collision, the shielding portion 21D also attempts to move to the front side in the vehicle front-rear direction at the same acceleration as the object X by the inertial force.

Here, if the shield portion 21D and the sub-shield portion 61 have the exact same configuration, the inertial force for moving the shield portion 21D to the vehicle front-rear direction front side, and the inertial force for moving the sub-shield portion 61 to the vehicle front-rear direction front side become the same value. Since the inertial force is offset by the pinion gear 60, the shield portion 21D and the sub-shield portion 61 do not move together. In this regard, in the vehicle table device 10D of the present embodiment, since the sub-shield portion 61 is lighter than the shield portion 21D, as indicated by the white arrow in FIG. 9, when the shield portion 21D moves to the front side in the vehicle front-rear direction, using the force that the shield portion 21D moves to the front side in the vehicle front-rear direction, that is, the pinion gear 60 meshing with the rack teeth 61a of the sub-shield portion 61 rotates counterclockwise in FIG. 9, and as indicated by the black arrow in FIG. 9, the sub-shield portion 61 moves to the rear side in the vehicle front-rear direction at the same rate as the shield portion 21D. Thus, as indicated by the white arrow in FIG. 7, the partition portion 23 from the front end portion of the table main body 13 is in a state of projecting upward, as indicated by the hatching arrow in FIG. 7, the rear end portion of the table main body 13 (the end opposite to the end portion where the shield portion 21D protrudes) the sub-shield portion 61 is in a state of projecting upward.

Therefore, since the sub-shield portion 61 protrudes upward from the rear end portion of the table main body 13 even if the object X that is about to protrude from the table main body 13 toward the front side in the vehicle front-rear direction once hits the shield portion 21D protruding upward from the front end portion of the table main body 13 and then bounces back toward the rear side in the vehicle front-rear direction, not only the object X can be suppressed from hitting the occupant P1 seated on the front row seat 3 but also the occupant P2 seated on the rear row seat 5 can be suppressed from hitting.

Embodiment 4

The present embodiment is different from the first embodiment in that the shield portion is accelerated by using other physical forces in addition to the inertial forces. Hereinafter, differences from the first embodiment will be mainly described.

Figure 10:
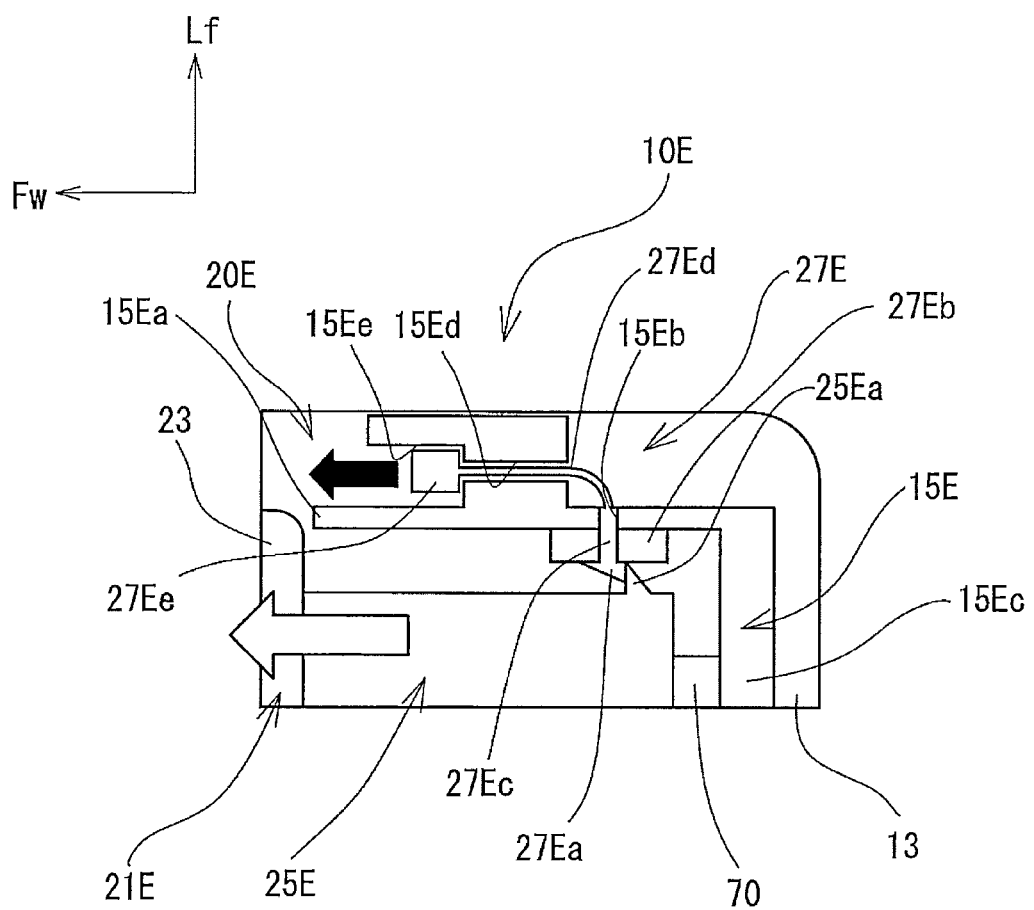
FIG. 10 is a view of a table main body as viewed from below, schematically showing a pop-out suppression unit in the vehicle table device according to the fourth embodiment.

FIG. 10 is a view of the table main body 13 viewed from below, schematically showing the pop-out suppression unit 20E in the vehicle table device 10E according to the present embodiment. In FIG. 10, the bottom surface portion of the cover 15E and the like are not shown for the sake of clarity. The vehicle table device 10E includes a base 11, a table main body 13, a cover 15E, and a pop-out suppression unit 20E.

The cover 15E has substantially the same configuration as that of the cover 15, and is attached to the lower side of the table main body 13 to form a space between itself and the table main body 13 for accommodating the shielding portion 21E. In addition, a guide portion (not shown) that is curved upward, similar to the guide portion 19, is formed in the cover 15E. However, in the cover 15E, unlike the cover 15, as shown in FIG. 10, a through-hole 15Eb is formed in the side wall portion 15Ea, and a communication passage 15Ed extending in the front-rear direction of the vehicle and a storage chamber 15Ee in which the front side is released are formed outside the space for accommodating the shield portion 21E.

The pop-out suppression unit 20E includes a plate-shaped shield portion 21E which is accommodated between the table main body 13 and the cover 15E and which is movable to the front side in the vehicle front-rear direction by an inertial force or the like at the time of sudden braking or in a front-rear collision, a strong spring (urging means) 70 which urges the shield portion 21E in the same direction as the direction in which the shield portion 21E moves by the inertial force, and a stopper portion (restraining means) 27E which restrains the movement of the shield portion 21E.

The shielding portion 21E has substantially the same configuration as that of the shielding portion 21, and the relatively light partition portion 23 and the relatively heavy weight portion 25E are connected such that the partition portion 23 is on the front side in the vehicle front-rear direction and the weight portion 25E is on the rear side in the vehicle front-rear direction. In the weight portion 25E, the engaged portion 25Ea having a right-angled triangle shape in a plan view is formed at the rear end portions of both side edge portions in the vehicle widthwise direction so that the oblique side faces the vehicle front-rear direction rear side.

The strong spring 70 is attached to the rear wall portion 15Ec so as to be interposed between the weight portion 25E and the rear wall portion 15Ec of the cover 15E, as shown in FIG. 10. The strong spring 70 is contracted in a normal state (at the time of sudden braking or at the time of front collision), and constantly urges the shielding portion 21E toward the front side in the front-rear direction of the vehicle. By providing such a strong spring 70, when the shield portion 21E moves to the front side in the vehicle front-rear direction by the inertial force, the urging force of the strong spring 70 is added, so that the shield portion 21E can be moved to the front side in the vehicle front-rear direction at a high speed.

As described above, since the shield portion 21E is constantly biased by the strong spring 70, it is impossible to prevent the shield portion 21E from protruding if the stopper portion 27E has the same configuration as that of the stopper portion 27. Therefore, in the vehicle table device 10E of the present embodiment, the stopper portion 27E is configured to be completely different from the stopper portion 27.

Specifically, as shown in FIG. 10, the stopper portion 27E includes an engaging piece 27Ea having a right-angled triangle shape in plan view, a spring 27Eb, a shaft portion 27Ec, a coupling member 27Ed, and a mass member 27Ee. The engaging piece 27Ea is attached to the side wall portion 15Ea of the cover 15E via a spring 27Eb so that the oblique side faces the front side in the front-rear direction of the vehicle. The shaft portion 27Ec is inserted into the through-hole 15Eb of the side wall portion 15Ea, and its distal end is connected to an adjacent piece (bottom side) of the engaging piece 27Ea. The mass member 27Ee is accommodated in the storage chamber 15Ee in which the front side is released. The coupling member 27Ed is inserted into a communication passage 15Ed extending in the front-rear direction of the vehicle, and a front end portion thereof is connected to the mass member 27Ee, while a rear end portion thereof is connected to the shaft portion 27Ec.

In the stopper portion 27E configured as described above, since the opposite side (height) of the engaged portion 25Ea and the opposite side of the engaging piece 27Ea are engaged in a normal state, the shielding portion 21E is prevented from moving against the urging force of the strong spring 70. On the other hand, when the mass member 27Ee moves more than a predetermined value (the length of the opposite side of the engaged portion 25Ea) to the front side in the front-rear direction of the vehicle by the inertial force at the time of the sudden braking or the front collision, the engaged portion 25Ea is pulled toward the side wall portion 15Ea via the coupling member 27Ed and the shaft portion 27Ec, so that the spring 27Eb is contracted and the constraint on the shielding portion 21E is released.

Effects

According to the present embodiment, when the object X is accelerated by the inertial force so as to protrude from the table main body 13 toward the front side in the vehicle front-rear direction, the mass member 27Ee also moves to the front side in the vehicle front-rear direction by the inertial force, so that it is possible to solve the constraint on the shielding portion 21E with a simple configuration. Thus, by the urging force of the strong spring 70, the shield portion 21E is moved at a high speed to the front side in the front-rear direction of the vehicle, it is possible to quickly produce a condition in which the shield portion 21E (the partition portion 23) protrudes upward from the front end portion of the table main body 13. Therefore, it is possible to more reliably suppress the object X that is going to protrude from the table main body 13 from hitting the occupant P1.

Modification 1

This modification is different from the first embodiment in that a squib is used instead of the strong spring 70. Hereinafter, differences from the first embodiment will be mainly described.

Figure 11:
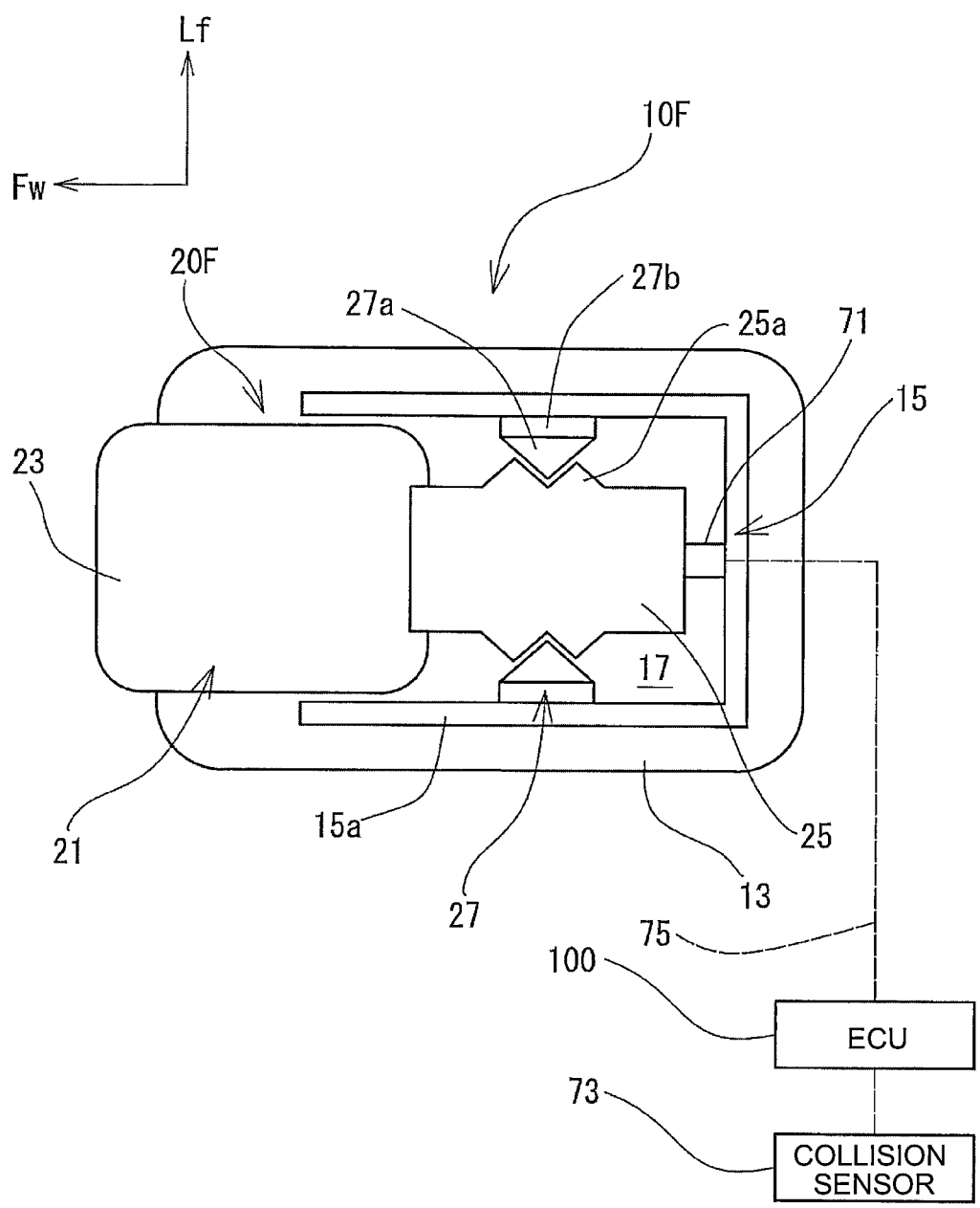
FIG. 11 is a view schematically showing a pop-out suppression unit in the vehicle table device according to Variation 1 of Embodiment 4 when the table main body is viewed from below.

FIG. 11 is a view of the table main body 13 viewed from below, schematically showing the pop-out suppression unit 20F in the vehicle table device 10F according to the present modification. Note that the vehicle table device 10F includes the collision sensor 73 and ECU 100, and the pop-out suppression unit 20F includes the squib 71 and the like, since the same configuration as the vehicle table device 10 of the first embodiment, the configuration other than the collision sensor 73 and the squib 71 and the like will not be described as appropriate.

The collision sensor 73 is configured to include at least one of an outside camera (not shown), a millimeter wave radar (not shown), and a laser radar (not shown) for capturing a situation outside the vehicle 1. ECU (control unit) 100 is connected to the collision sensor 73 and the squib 71 via a communication line 75 so as to be capable of transmitting and receiving signals. ECU 100 is configured to be able to detect various types of collisions with respect to the vehicle 1 on the basis of a signal from the collision sensor 73, and to transmit a signal indicating the collision detection to the squib 71.

Therefore, in relation to the claims, the collision sensor 73 and ECU 100 of the present embodiment correspond to the "detection unit for detecting the front or rear collision of the vehicle" as referred to in the present disclosure.

The pop-out suppression unit 20F includes a squib 71 that applies a driving force to the shield portion 21 in the same direction as the direction in which the shield portion 21 moves by the inertial force. The squib 71 is attached to the rear wall portion so as to be interposed between the weight portion 25 and the rear wall portion of the cover 15. The squib 71 has a configuration similar to that of a known squib used in an airbag or a pretensioner, and therefore, a detailed description thereof will be omitted, but when a signal representing collision detection is input (front collision is detected by a detection unit) from a ECU 100, the squib is ignited to generate a driving gas.

Effects

According to the present modification, when ECU 100 detects the front projection of the vehicle 1, the squib 71 is ignited to generate the driving gases, so that the shield portion 21 is moved to the front side in the vehicle front-rear direction at a higher speed, and the shield portion 21 protrudes upward from the front end portion of the table main body 13 like a screen, so that it is possible to more quickly create the situation.

Modification 2

This modification is different from the first embodiment and the first modification in that the strong spring 70 and the squib 71 are used in combination. Hereinafter, differences from the first embodiment and the first modification will be mainly described.

Since it is not realistic to operate the squib 71 at the frequency of sudden braking with a relatively high frequency of occurrence, the combination of the strong spring 70 and the stopper portion 27E as in the first embodiment and the combination of the squib 71 and the detection unit (the collision sensor 73 and ECU 100) as in the first modification are used together in the present modification.

Effects

According to the present modification, when the occurrence frequency is relatively high, the shield portion 21 can be moved at a high speed to the front side in the vehicle front-rear direction by utilizing the inertial force of the mass member 27Ee and the biasing force of the strong spring 70, and when the occurrence frequency is relatively low, the shield portion 21 can be moved at a higher speed to the front side in the vehicle front-rear direction by utilizing the driving force applied by the squib 71.

Embodiment 5

The present embodiment differs from the above-described embodiments in that the object X that is to be protruded from the table main body 13 is not partitioned between the object X and the occupant P1, P2 by the shielding portion 21 or the like, but the object X is suppressed from being protruded from the table main body 13. Hereinafter, differences from the respective embodiments will be mainly described.

Figure 12:
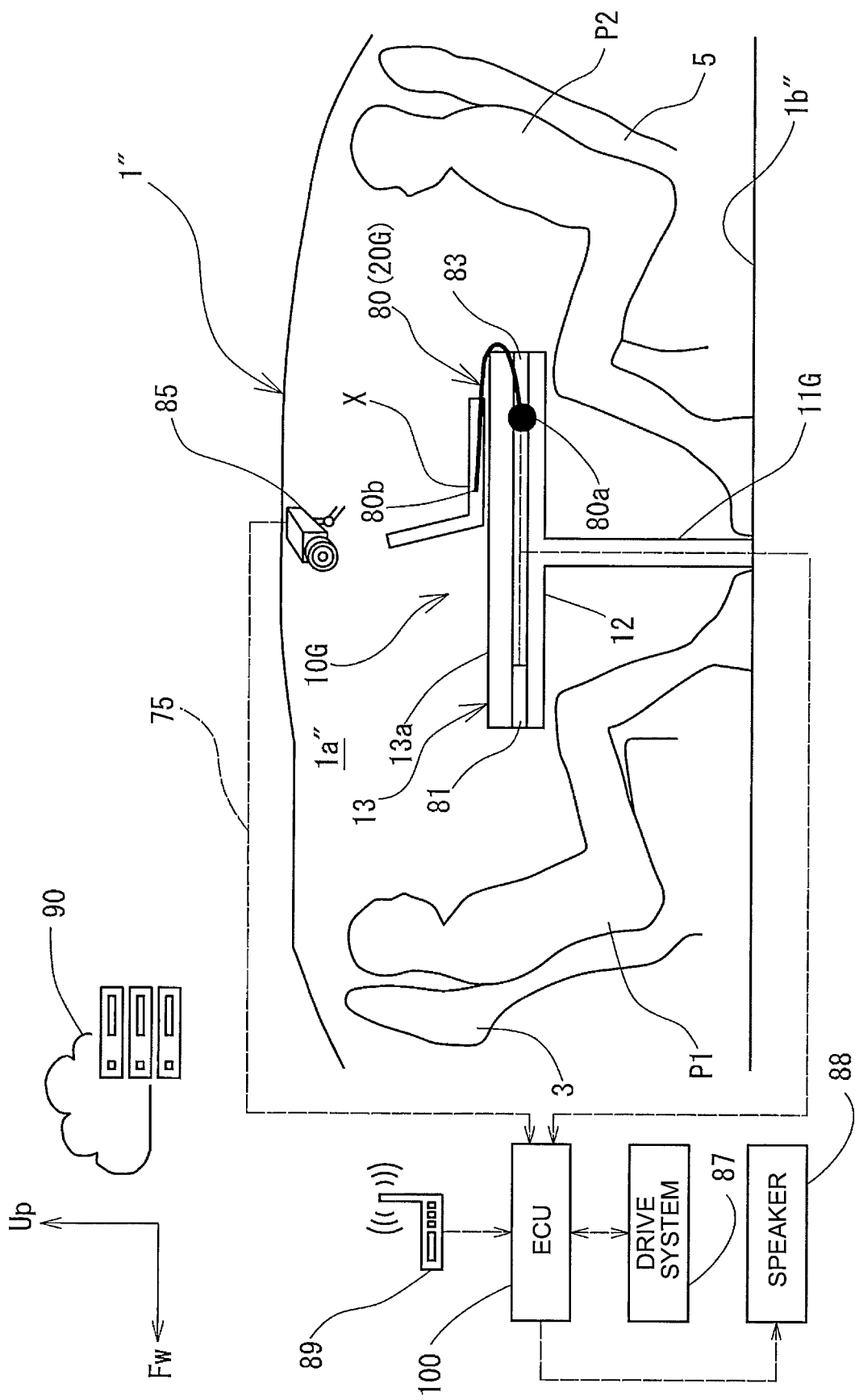
FIG. 12 is a diagram schematically illustrating a vehicle on which the vehicle table device according to the fifth embodiment is mounted.

FIG. 12 is a diagram schematically showing a vehicle 1" on which the vehicle table device 10G according to the present embodiment is mounted. As shown in FIG. 12, in the vehicle 1", a front row seat 3 in which the occupant P1 can be seated backward and a rear row seat 5 in which the occupant P2 can be seated forward are provided in the vehicle cabin 1a" so as to be aligned in the vehicle front-rear direction.

As the vehicle table device 10G for vehicles mounted on this vehicles 1" is shown in FIG. 12, The base 11G provided between the front row seat 3 and the rear row seat 5 on a floor 1b" and the frame 12 attached to the upper end of a base 11G, It is provided above the frame 12, and can place the object X on the upper surface 13a, the table main body 13, the wire 80, a front side and a rear side weight sensor 81, 83, the upper surface 13a and the wire 80 of the table main body 13 are imaged An infrared camera 85, a ECU 100 for controlling the travel of the vehicle 1" by controlling various devices in the vehicle 1", a drive system 87 (for example, a drive motor, etc.), a speaker 88, and a wireless communication device 89 are provided.

The wire (string-like member) 80 as the pop-out suppression unit 20G in the present embodiment is configured such that one end 80a (see the black portion in FIG. 12) is connected to the table main body 13 and the other end 80b is connectable to the object X. The connecting position between the one end 80a and the table main body 13 is preferably set to be later than the center of the table main body 13 in the front-rear direction, considering that the object X is moved to the front side in the vehicle front-rear direction by the inertial force during the sudden braking or the front collision. In addition, the pop-out suppression unit 20G may have a string shape as long as it does not limit the placement position of the object X on the upper surface 13a of the table main body 13, and may be, for example, a chain or the like, instead of the wire 80.

The front weight sensor 81 and the rear weight sensor 83 are provided between the frame 12 and the table main body 13, and are configured to measure the weight of the object X placed on the upper surface 13a of the table main body 13. It is to be noted that the two weight sensors, i.e., the front weight sensor 81 and the rear weight sensor 83, are provided so as not to be affected by the floor G (G acting on the object inside the vehicle cabin 1a via the floor 1b) during traveling, in other words, to minimize the measurement error by averaging the measured values of the front weight sensor 81 and the rear weight sensor 83. The front weight sensor 81 and the rear weight sensor 83 are connected to ECU 100 via a communication line 75, and the front and rear weight sensors 81 and 83 transmit the measured data to ECU 100.

The infrared-ray camera 85 is configured to capture an image used for determining whether or not the object X is placed on the upper surface 13a of the table main body 13, or an image used for determining whether or not the other end 80b of the wire 80 is connected to the object X, by capturing an image of the upper surface 13a, the wire 80, or the like of the table main body 13. The infrared camera 85 is connected to ECU 100 via a communication line 75, and images captured by the infrared camera 85 are transmitted to ECU 100.

More specifically, on the upper surface 13a of the table main body 13, a dedicated pattern which is not visible to the naked eye and can be imaged by the infrared camera 85 is drawn. The wire 80 is coated with a paint that is not visible to the naked eye and can be imaged by the infrared camera 85. Thus, the accuracy of determining whether or not the object X is placed on the upper surface 13a of the table main body 13 and the accuracy of determining whether or not the other end 80b of the wire 80 is connected to the object X can be improved without impairing the design of the table main body 13.

The radio communication device (communication unit) 89 is configured to periodically receive a dynamic map from the external servers 90 and transmit a reception result to ECU 100. Thus, ECU 100 can determine whether or not the vehicle 1" is currently traveling on a particular road (for example, an autonomous vehicle dedicated road).

ECU 100 is configured to determine whether or not the object X is placed on the upper surface 13a of the table main body 13 based on the data measured by the front-side and rear-side weight sensors 81 and 83 and the image data captured by the infrared-ray camera 85. ECU 100 is configured to determine whether or not the other end 80b of the wire 80 is connected to the object X based on the image data captured by the infrared-ray camera 85.

Therefore, in relation to the claims, the front-side and rear-side weight sensors 81 and 83, the infrared-camera 85, and ECU 100 of the present embodiment correspond to the "placement determination unit that determines whether or not an object is placed on the upper surface of the table main body". In addition, the infrared-ray camera 85 and ECU 100 of the present embodiment correspond to a "connection determination unit that determines whether or not the other end of the string-like member is connected to an object".

Thus, ECU 100 is configured to execute the following control (1) to (3) based on a determination result such as whether or not the vehicle 1" is currently traveling on a particular road, whether or not the object X is placed on the upper surface 13a of the table main body 13, and whether or not the other end 80b of the wire 80 is connected to the object X.

Basically, ECU 100 (1) determines that the object X is placed on the upper surface 13a of the table main body 13, and when it is determined that the other end 80b of the wire 80 is not connected to the object X, issues a warning to the occupant P1, P2 via the speaker 88, and/or outputs a command to the drive system 87 to execute control for limiting the speed of the vehicle 1" to a predetermined speed or less.

However, since the possibility of an accident or sudden braking is very small on the road dedicated to the autonomous driving vehicle, ECU 100 executes control that does not limit the velocity of the vehicle 1" even when it is determined that the object X is placed on the upper surface 13a of the table main body 13 and the other end 80b of the wire 80 is not connected to the object X when it is determined that the vehicle 1" is traveling on the road dedicated to the autonomous driving vehicle based on the dynamic map (2).

Further, when limiting the speed of the vehicle 1" to a predetermined speed or less, (3) ECU 100 performs control for setting the predetermined speed in accordance with the weight of the object X measured by the front side and rear side weight sensors 81 and 83. Specifically, ECU 100 executes control for setting a predetermined velocity to be slower as the measured weight of the object X is heavier.

Action and Effect

According to the vehicle table device 10G of the present embodiment, by connecting the other end 80b of the wire 80 whose one end portion 80a is connected to the table main body 13 to the object X, it is possible to prevent the object X placed on the upper surface 13a of the table main body 13 from jumping out of the table main body 13 by the inertial force.

However, it is conceivable that the occupant P2 using the object X may forget to connect the other end 80b of the wire 80 to the object X. When ECU 100 determines that the object X is placed on the upper surface 13a of the table main body 13 and determines that the other end 80b of the wire 80 is not connected to the object X, it is possible to prevent the object X from jumping out of the table main body 13 by prompting the occupant P2 to connect the other end 80b of the wire 80 to the object X (and/or causing no acceleration that causes the object X to jump out of the table main body 13 in the first place) by issuing an alarm to the occupant P2 via the speaker 88 (and/or limiting the speed of the vehicle 1" to a predetermined speed or less).

Further, based on the dynamic map, when it is determined that the vehicle 1" is traveling on the road dedicated to the autonomous vehicle with a very small possibility of an accident or a sudden braking, even when it is determined that the object X is placed on the upper surface 13a of the table main body 13 and it is determined that the other end 80b of the wire 80 is not connected to the object X, the speed of the vehicle 1" is not limited, so that it is possible to suppress an unnecessary speed limit from being imposed.

Further, if the weight of the object X placed on the upper surface 13a of the table main body 13 is relatively light, it is difficult for the object X that has protruded from the table main body 13 to come into contact with the occupant P1, P2, but ECU 100 sets the predetermined speed slower as the weight of the object X measured by the front side and rear side weight sensors 81 and 83 becomes heavier (the lighter the weight of the object X, the faster the predetermined speed is set), so that it is possible to suppress unnecessary speed limit from being imposed.

Other Embodiments

The disclosure is not limited to the embodiment and can be implemented in various other forms without departing from the spirit or main characteristics thereof.

In Modification 1 and 2 of Embodiment 1, Embodiment 3, Embodiment 4, and Modification 1 and 2 of Embodiment 4, as in Embodiment 1, the case where the shield portion 21 or the like is projected upward from the front end portion of the table main body 13 is targeted, but not limited thereto, as in Embodiment 2, the case where the shield portion 21 or the like is projected upward from the rear end portion of the table main body 13 may be targeted.

Further, in the above embodiments, the object X and the occupant P1, P2 to be protruded from the table main body 13 are partitioned by the shielding portion 21 or the like (Embodiments 1 to 4 and modifications thereof), and the object X is suppressed from protruding from the table main body 13 (Embodiment 5). However, the present disclosure is not limited thereto, and the configurations in Embodiments 1 to 4 and the modifications thereof and the configurations in Embodiment 5 may be appropriately combined.

In this way, by urging the occupant P2 to connect the other end 80b of the wire 80 to the object X and not causing an acceleration such that the object X jumps out of the table main body 13, the object X can be prevented from jumping out of the table main body 13. In addition, since the shield portion 21 or the like protrudes upward like a screen from the front end portion or the rear end portion of the table main body 13, even if there is an erroneous determination of the connection determination unit or the like, it is possible to reliably suppress the object X that is trying to jump out of the table main body 13 from hitting the occupant P1, P2.

Further, in the above embodiment, the infrared camera 85 is used to image the upper surface 13a, the wire 80, and the like of the table main body 13, but the present disclosure is not limited thereto, and the upper surface 13a, the wire 80, and the like of the table main body 13 may be imaged using a normal camera.

Thus, the above-described embodiments are merely illustrative in all respects, and should not be construed as limiting. Furthermore, all variations and modifications falling within the equivalent scope of the claims are within the scope of the disclosure.

According to the present disclosure, it is possible to suppress the object placed on the table from popping out of the table by the inertial force and hitting the occupant, it is very useful to apply to the vehicle table device provided between the seats arranged so as to be aligned in the vehicle longitudinal direction in the vehicle cabin.

What is claimed is:

1. A table device for a vehicle, the table device being provided between seats arranged in a vehicle cabin so as to be aligned in a vehicle front-rear direction, the table device comprising:
   a table main body, an object being able to be placed on an upper surface of the table main body; and
   a pop-out suppression unit for suppressing the object from popping out from the table main body when an acceleration is generated in the object, causing the object to pop out from the table main body toward a front side or a rear side in the vehicle front-rear direction, wherein:
   the seats are configured such that occupants sit facing each other in the vehicle front-rear direction;
   the pop-out suppression unit includes a plate-shaped shield portion that is provided on a lower side of the table main body and that is movable toward the front side in the vehicle front-rear direction at an acceleration equivalent to an acceleration of the object, by an inertial force during a sudden braking or a front collision;
   the shield portion is made of a member having a first elasticity on an upper surface side and a member having a second elasticity on a lower surface side, the second elasticity is greater than the first elasticity, and is configured to bend toward the upper surface side when a tensile force is applied to the lower surface side and to return to a straight line shape when the tensile force is released; and
   a front end portion of the table main body is provided with a guide portion that guides the shield portion upward while applying a tensile force to the lower surface side of the shield portion that is moving forward in the vehicle front-rear direction.

2. The table device according to claim 1, wherein:
   the pop-out suppression unit includes the plate-shaped shield portion that is provided on the lower side of the table main body and that is movable toward the rear side in the vehicle front-rear direction at the acceleration equivalent to the acceleration of the object, by an inertial force during a rear collision; and
   a rear end portion of the table main body is provided with the guide portion that guides the shield portion upward while applying the tensile force to the lower surface side of the shield portion that is moving rearward in the vehicle front-rear direction.

3. The table device according to claim 1, wherein the pop-out suppression unit includes a return restriction unit for restricting a return movement of the shield portion toward the rear side or the front side in the vehicle front-rear direction so as to maintain a state in which the shield portion protrudes upward from the table main body.

4. The table device according to claim 3, wherein the return restriction unit is configured to be able to cancel a restriction of the return movement of the shield portion by a predetermined operation.

5. The table device according to claim 1, wherein the pop-out suppression unit includes a sub-shield portion that is provided on the lower side of the table main body and that moves in an opposite direction of the shield portion by utilizing a force of the shield portion moving in the vehicle front-rear direction, to protrude upward from an end portion of the table main body on an opposite side of an end portion in which the shield portion protrudes.

6. The table device according to claim 1, wherein:
   the pop-out suppression unit includes an urging unit for urging the shield portion in the same direction as a direction in which the shield portion moves by an inertial force, and a restraining unit for restraining movement of the shield portion; and
   the restraining unit includes a mass member, and is configured to release a restraint on the shield portion when the mass member is moved by an inertial force in the vehicle front-rear direction by a predetermined amount or more.

7. The table device according to claim 1, further comprising a detection unit for detecting a front collision or a rear collision, wherein:
   the pop-out suppression unit includes a squib for applying a driving force to the shield portion in the same direction as a direction in which the shield portion moves by an inertial force; and
   the squib is configured to be ignited to generate driving gas when a front collision or a rear collision is detected by the detection unit.

8. The table device according to claim 1, wherein:
   the pop-out suppression unit includes a mass body that is heavier in weight than the shield portion and that is movable in the vehicle front-rear direction by an inertial force, and a gear mechanism for transmitting an inertial force of the mass body to the shield portion; and
   the gear mechanism includes a first pinion gear that meshes with rack teeth provided in the mass body, and a second pinion gear that rotates coaxially with the first pinion gear and that meshes with rack teeth provided in the shield portion, the second pinion gear having a larger number of teeth than the first pinion gear.

9. The table device according to claim 1, wherein:
the pop-out suppression unit is a string member configured to be connected to the table main body on one end and configured to be connectable to the object on the other end;
the pop-out suppression unit includes
- a placement determination unit for determining whether the object is placed on an upper surface of the table main body,
- a connection determination unit for determining whether the other end of the string member is connected to the object, and
- a control unit for controlling travel of the vehicle; and the control unit is configured to issue a warning to occupants and/or limit a speed of the vehicle to a predetermined speed or less when the placement determination unit determines that the object is placed and the connection determination unit determines that the other end of the string member is not connected to the object.

10. The table device according to claim 9, further comprising a communication unit for periodically receiving a dynamic map, wherein the control unit is configured not to limit the speed of the vehicle when the vehicle is determined to be traveling on a particular road based on the dynamic map, even when the placement determination unit determines that the object is placed and the connection determination unit determines that the other end of the string member is not connected to the object.

11. The table device according to claim 9, wherein:
a dedicated pattern is drawn on the upper surface of the table main body, the dedicated pattern being a pattern that is not visible to a naked eye and is able to be imaged by an infrared camera; and
the placement determination unit is configured to determine whether the object is placed on the upper surface of the table main body based on an image captured by the infrared camera.

12. The table device according to claim 9, further comprising a weight sensor for measuring a weight of the object placed on the upper surface of the table main body, wherein the control unit is configured to set the predetermined speed in accordance with the weight of the object measured by the weight sensor.

13. The table device according to claim 1, wherein: the pop-out suppression unit includes a string member configured to be connected to the table main body on one end and configured to be connectable to the object on the other end; the pop-out suppression unit includes a placement determination unit for determining whether the object is placed on an upper surface of the table main body, a connection determination unit for determining whether the other end of the string member is connected to the object, and a control unit for controlling travel of the vehicle, wherein the control unit is configured to issue a warning to occupants and/or limit a speed of the vehicle to a predetermined speed or less when the placement determination unit determines that the object is placed and the connection determination unit determines that the other end of the string member is not connected to the object.

* * * * *